US012587486B2

(12) United States Patent
    Matthews et al.

(10) Patent No.: US 12,587,486 B2
(45) Date of Patent: Mar. 24, 2026

(54) MULTI-STAGE SCHEDULER

(71) Applicant: Marvell Asia Pte, Ltd., Singapore (SG)

(72) Inventors: William Brad Matthews, Los Gatos, CA (US); Ashwin Alapati, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 319 days.

(21) Appl. No.: 18/227,117

(22) Filed: Jul. 27, 2023

(65) Prior Publication Data

US 2024/0340250 A1      Oct. 10, 2024

Related U.S. Application Data

(60) Provisional application No. 63/457,122, filed on Apr. 4, 2023.

(51) Int. Cl.
    H04L 47/625        (2022.01)
    H04L 47/628        (2022.01)
(52) U.S. Cl.
    CPC ........ H04L 47/6255 (2013.01); H04L 47/628 (2013.01)
(58) Field of Classification Search
    CPC .......................... H04L 47/6255; H04L 47/628
    See application file for complete search history.

(56) References Cited

U.S. PATENT DOCUMENTS

| | | | |
|---|---|---|---|
| 10,009,293 B1 * | 6/2018 | Mukherjee | H04L 45/74 |
| 10,581,759 B1 | 3/2020 | Kwan et al. | |
| 10,846,225 B1 | 11/2020 | Matthews et al. | |
| 2019/0042513 A1 * | 2/2019 | Fleming, Jr. | G06F 9/30145 |

OTHER PUBLICATIONS

European Patent Office, Application No. 24168526.2, European Search Report dated Aug. 12, 2024.

* cited by examiner

*Primary Examiner* — Samina F Choudhry
(74) *Attorney, Agent, or Firm* — Shield Intellectual Property PC; Zhichong Gu

(57)          ABSTRACT

Packet metadata for incoming packets are buffered in queue selection buffers associated with a port of a network node. Packet data for outgoing packets are buffered in a port selection buffer associated with the port. At a selection clock cycle, while a port scheduler of the network node selects a subset of the packet data for a subset of the outgoing packets from the port selection buffer, a queue scheduler of the port concurrently selects a subset of the packet metadata for a subset of the incoming packets from the queue selection buffers and adds new packet data for new outgoing packets to the port selection buffer of the port. The new packet data are derived based at least in part on the subset of the packet metadata for the subset of the incoming packets.

27 Claims, 9 Drawing Sheets buffer packet metadata for incoming packets in queue selection buffers 502 buffer packet data for outgoing packets in a port selection buffer 504 while selecting packet data from the port selection buffer, concurrently select packet metadata from queue selection buffer 506 add packet data to the port selection buffer 508

MULTI-STAGE SCHEDULER

CROSS-REFERENCE TO RELATED APPLICATIONS

This application claims the benefit of priority to U.S. Provisional Patent Application No. 63/457,122 filed on 4 Apr. 2023, which is hereby incorporated by reference.

TECHNICAL FIELD

Embodiments relate generally to packet delivery, and, more specifically, to multi-stage scheduler.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Minimizing latencies in next-hop and end-to-end packet delivery is typically a quite significant goal for data communication networks or switching devices used in a wide variety of computer applications. As more and more high capacity switching devices are being deployed in the field, time budgets available for processing more and more packets by different processing components present in packet delivery paths are getting shorter and shorter. As a result, some or all of the processing components including but not limited to network interfaces or ports can spend much time idling waiting for packets to arrive. While these network interfaces or ports may be of nominally or theoretically high packet delivery capacities or bandwidths, much of such high capacities or bandwidths could still be wasted. For example, the network interfaces or ports could be idling for much time when upstream processing components could not timely process and transfer sufficient numbers of packets to these network interfaces or ports for packet delivery.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 5 illustrates an example process flow; and

FIG. 6 is a block diagram of an example computer system.

DETAILED DESCRIPTION

Figure 1:
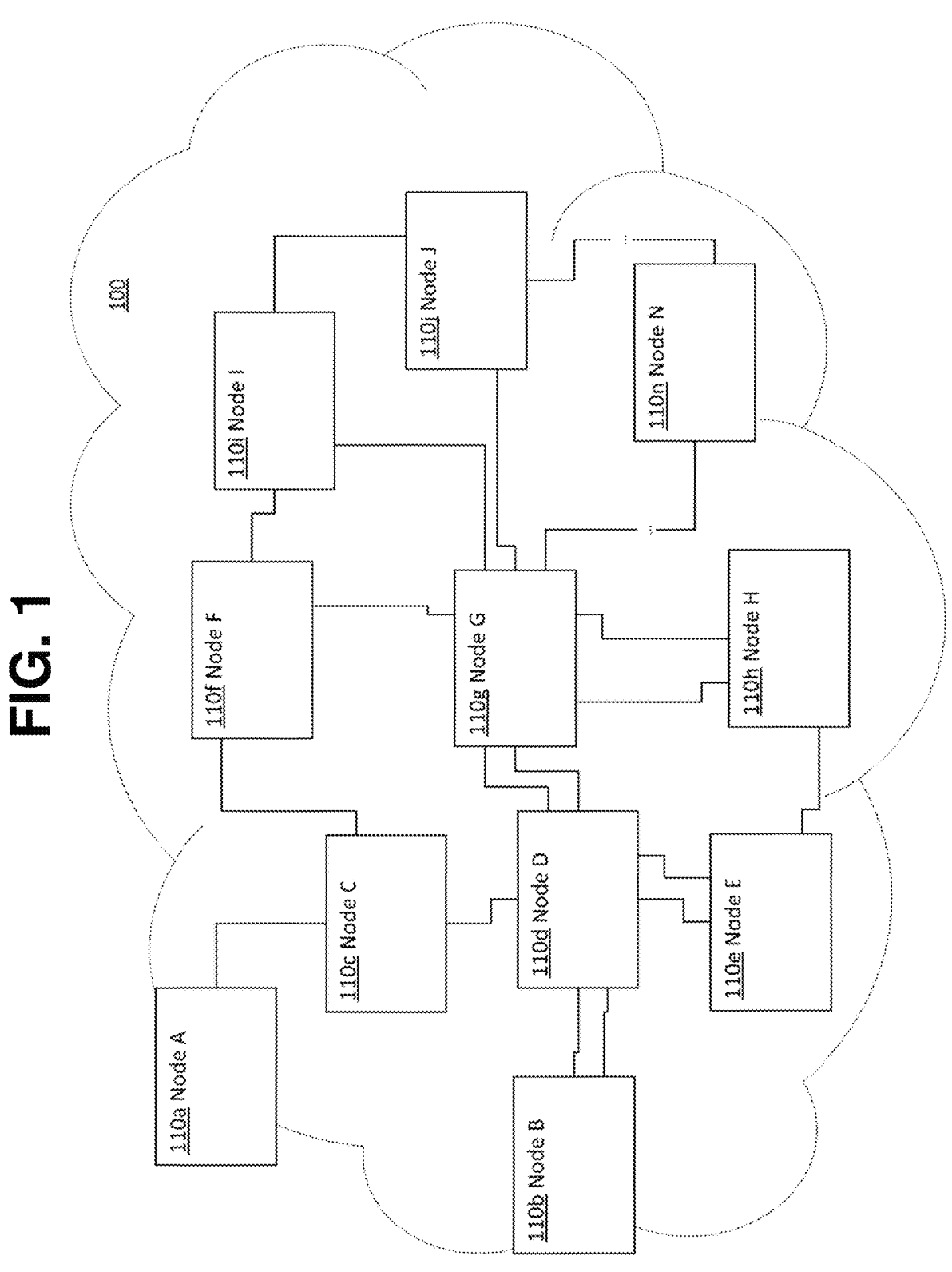
FIG. 1 illustrates example networking systems.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0 General Overview
2.0. Structural Overview
  2.1. Data Units
  2.2. Network Paths
  2.3. Network Device
  2.4. Ports
  2.5. Packet Processors
  2.6. Buffers
  2.7. Queues
  2.8. Traffic Management
  2.9. Forwarding Logic
  2.10. Multi-Stage Scheduler
  2.11. Miscellaneous
3.0. Functional Overview
  3.1. Port and Queue Scheduling
  3.2. Port or Queue Eligibility
  3.3. Work Conserving
  3.4. Queue Selection Data Flows
  3.5. Queue States
  3.6. Queue Selection Policies
  3.7. Selection Operations
  3.8. Port Bundle Scheduling
4.0. Example Embodiments
5.0. Implementation Mechanism-Hardware Overview
6.0. Extensions and Alternatives

1.0. General Overview

As transmission or transfer rates of packets between different network nodes or switches and between different packet processing components within a network node or switch become higher and higher, the time between the arrival of a packet and the transmission/transfer of the packet becomes less and less.

Techniques as described herein can be implemented or applied to keep ports in an active packet transmission or transfer states without starvation. As a part of a multi-stage scheduler, a port selection buffer may be set up for a (e.g., each, etc.) port, while one or more queue selection buffers may be set up for one or more queues of the port.

A port scheduler of the multi-stage scheduler may perform port scheduling operations that arbitrate access to (e.g., egress, etc.) bandwidths or port rates across (e.g., eligible, etc.) ports, whereas a (e.g., each, etc.) per-port queue scheduler for a port in the multi-stage scheduler may perform queue scheduling operations that arbitrate access to access to (e.g., egress, etc.) bandwidth or port rate across (e.g., eligible, etc.) queues of the port. The same or different eligibility factors or one or more combinations thereof may be used to determine whether a given port or queue among ports or queues is eligible for selection or dequeuing by a port or queue scheduler from a port or queue selection buffer.

Port and queue scheduling operations that respectively resolve port and queue states for the ports and queues associated with the ports may be decoupled or deserialized from each other in separate timing loops. These port and queue scheduling operations may also be decoupled or deserialized from separate operations that transmit or transfer packets selected from the queues associated with the ports.

As the operations and the timing loop of the port scheduler or port scheduling operations are decoupled from those of the queue schedulers or queue scheduling operations, instead of picking or selecting packets for transmission or transfer directly from eligible queues associated with the ports, the port scheduler or port transmission logic can pick or select packets from port selection buffers for eligible ports. The port selection buffers may store or buffer sets of packet data for packets to enable these packets for transmission or transfer operations with no or little time latency. In other words, the sets of packet data buffered and/or selected from the port selection buffers may be specifically defined, generated, sized or composed to facilitate transmission or transfer operations at relatively high speed with minimized latency.

While the ports have a port scheduler performing port scheduling operations, queues of the ports have separate queue schedulers performing queue scheduling operations in separate timing loops. Each queue of one or more queues of a port has, or is assigned, a separate (per-queue) queue selection buffer in which queue states of the queue may be kept, maintained or updated.

A queue selection buffer for a queue can store sets of (e.g., relatively small data sized, 50 bits, etc.) packet metadata in queue selection buffer entries for packets—or cells/transfers partitioned from the packets—represented in the queue selection buffer. The packet metadata may include but is not necessarily limited to only, packet/cell control information that may be used by the queue scheduler to facilitate or control packet/cell selection operations, packet/cell copying operations, packet/cell enqueuing operations into a corresponding port selection buffer, etc. Both the port and queue selection buffers may only contain packet metadata. For example, packet metadata can be stored in a queue selection buffer (or a per queue buffer), and then transferred to a port selection buffer upon selection. Packet metadata from one or more queue buffer entries or elements may be transferred upon selection of a queue or corresponding per queue buffer. Likewise, packet metadata from one or more port buffer entries or elements may be selected upon selection of a port or a port selection buffer. In some operational scenarios, in comparison with packet data or packet payload for a packet in a port selection buffer, a set of packet metadata for the packet in an associated port or queue selection buffer may have a relatively small data size.

The queue scheduler can use the queue states and the sets of relatively small data sized packet metadata to readily make—with no or little time latency and with no or few additional operations—eligible queue selections across the queues of the port; generate set(s) of packet data from set(s) of packet metadata for the selected packet(s) and place the set(s) of packet data including but not limited to (e.g., additional, etc.) port transmission control information into the port selection buffer of the port.

At the same time in the separate timing loop, the port scheduler can independently and concurrently pick or select eligible (ready to send packets) ports and use one or more specific sets of packet data or specific port transmission control information therein retrieved from the port selection buffers of the eligible ports to access or determine (e.g., all, etc.) to-be-transmitted or -transferred packet data for packets to send (e.g., transmit or transfer, etc.).

Control information such as queue states stored in queue selection buffers can be used in selecting packets/cells or corresponding queue selection buffer entries from the queue selection buffers. Queue states may include, but are not necessarily limited to only, some or all of: an empty state, an empty-on-pick state and an end-of-packet or EOP-on-pick state, etc. Some or all of the queue states in a queue selection buffer can be used by a queue scheduler for the next cycle of queue selection. How many selections to dequeue a packet may be based on a cell or transfer count of the packet. Additionally, optionally or alternatively, a packet may be dequeued multiple times based on a packet copy count of the packet. Queue selection as described herein may dequeue a single cell of a packet, multiple cells of one or more packets, a single packet copy, multiple packet copies, multiple packets/cells represented in multiple queues, etc.

In some operational scenarios, a port or queue selection buffer may be implemented as a FIFO. For example, the first N packets among all packets in a queue of a port may be buffered with a queue selection buffer set up for the queue. If the queue is presently empty, then the first packet that arrives may be immediately inserted in the queue selection buffer. In some operational scenarios, a port or queue selection buffer may be implemented other than a FIFO. For example, a priority based scheme may be used to determine what packets among all packets in a queue of a port are to be buffered with a queue selection buffer set up for the queue.

In some operational scenarios, instead of transferring a packet as a whole to the next packet processing component (e.g., within the same network node/switch, traffic manager, packet processor, etc.) or the next hop, the packet may be transmitted or transferred by way of transmitting or transferring cells or transfers partitioned from the packet. In these operational scenarios a selection as described herein from a port/cell selection buffer may be made as a cell/transfer (level) selection, rather than a (whole) packet level selection.

A queue scheduler can implement, or perform its queue scheduling operations with, one or more queue selection policies (or queue servicing disciplines) such as strict priority (SP), weighted deficit round-robin (WDRR), weighted (WFQ), a byte-based queue selection policy, a packet-based queue selection policy, a combination of two or more different queue selection policies, different queue selection policies other than or in addition to those illustrated herein in detail, and so on. For example, the first queue in a plurality of queues of a port may be allocated with ten (10) packets, whereas the second queue in the plurality of queues may be allocated with five (5) packets. Maximum bandwidths may be specified for queues or traffic flow therein serve as shaping thresholds for traffic shaping or rate limiting operations, for example with token bucket shaper, leaky bucket shaper, etc. Additionally, optionally or alternatively, bandwidth allocations and statistics can be set or made in a multi-level hierarchy with different queues or different queue groups instead of a single or uniform port-level or queue-level bandwidth level.

A bandwidth (allocation or consumption) determined or specified in a queue selection policy or queue servicing list as described herein may be associated, measured or applied within a given time period. In some operational scenarios, different bandwidths or rates can be set or configured for different time periods for the same packet processing component, port, queue, traffic flow, etc. A bandwidth allocation may be used to determine or set a rate to add or fill tokens in a corresponding token bucket, whereas a bandwidth usage or consumption can be used to remove or drop tokens from the token bucket. A specific queue selection policy selected from among a plurality of different queue selection policies may be used as a fallback for other policies. The fallback selection policy may be applied in response to determining that other queue selection policies have been applied or exercised, or after tokens in token bucket(s) have been dropped and exhausted in these other queue selection policies based on specified and/or consumed rates or bandwidths.

Port and queue scheduling operations in a multi-stage scheduler as described herein can be work conserving. For example, queue schedulers as described herein can be configured to fill or push selections to the port selection buffer of a port until the port selection buffer becomes full so that the port will not be idle as much as possible.

In some operational scenarios, a port scheduler as described herein may implement a time division multiplexing (TDM) scheduling policy or servicing discipline. A port may be sub-divided or broken down to subports and allocate time slots of a time interval. The time slots allocated to the port may be jumbled or mixed with other time slots allocated to other ports in the same time interval to allow the subport of the same port to evenly distribute over entire assigned time slots in the time interval and to minimize jitter at recipient devices or packet processing components. Idle ports with no packets to send (or transmit/transfer) may be skipped from time slot allocations.

Approaches, techniques, and mechanisms are disclosed for scheduling packets for transmission or transfer operations by a packet processing component or a network node/switch within networks. A plurality of sets of packet metadata for a plurality of incoming packets is buffered in a plurality of queue selection buffers associated with a port of a network node. One or more sets of packet data for one or more outgoing packets are buffered in a port selection buffer associated with the port. At a selection clock cycle, while a port scheduler of the network node selects a subset of the one or more sets of packet data for a subset of the one or more outgoing packets from the port selection buffer, a queue scheduler of the port concurrently performs, for a plurality of packet queues set up for the port, the following operations. One or more sets of packet metadata for one or more incoming packets in the plurality of incoming packets are selected from among the plurality of sets of packet metadata stored in the plurality of queue selection buffers. One or more second sets of packet data for one or more second outgoing packets are added to the port selection buffer of the port. The one or more second sets of packet data are derived based at least in part on the one or more sets of packet metadata for the one or more incoming packets.

In other aspects, the inventive subject matter encompasses computer apparatuses and/or computer-readable media configured to carry out the foregoing techniques.

2.0. Structural Overview

FIG. 1 illustrates example aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a unit of data at the network layer (e.g., a TCP segment, etc.) to a second node 110 over a path that includes an intermediate node 110. This unit of data may be broken into smaller units of data at various sublevels before it is transmitted from the first node 110. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild certain subunits of data (e.g., frames and/or cells, etc.) and route those subunits to the second node 110 without ever composing the entire original data unit.

When a node 110 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the unit of data, a label to attach the unit of data, etc. In cases where multiple paths (e.g., over the same port, over different ports, etc.) to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g., a "five-tuple" combination of a source address, source port, destination address, destination port, and protocol, etc.). A flow is often intended to be sent in sequence, and network devices are therefore, in many operational scenarios, typically configured to send all data units within a given flow along a same path to ensure that the flow is received in sequence.

A node 110 may operate on network data at several different layers, and therefore view the same data as belonging to several different types of data units.

2.2. Network Paths

Any node in the depicted network 100 may communicate with any other node in the network 100 by sending data units through a series of nodes 110 and links, referred to as a path. For example, Node B (110*b*) may send data units to Node H (110*h*) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g., which egress port it should send the data unit out on, etc.). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
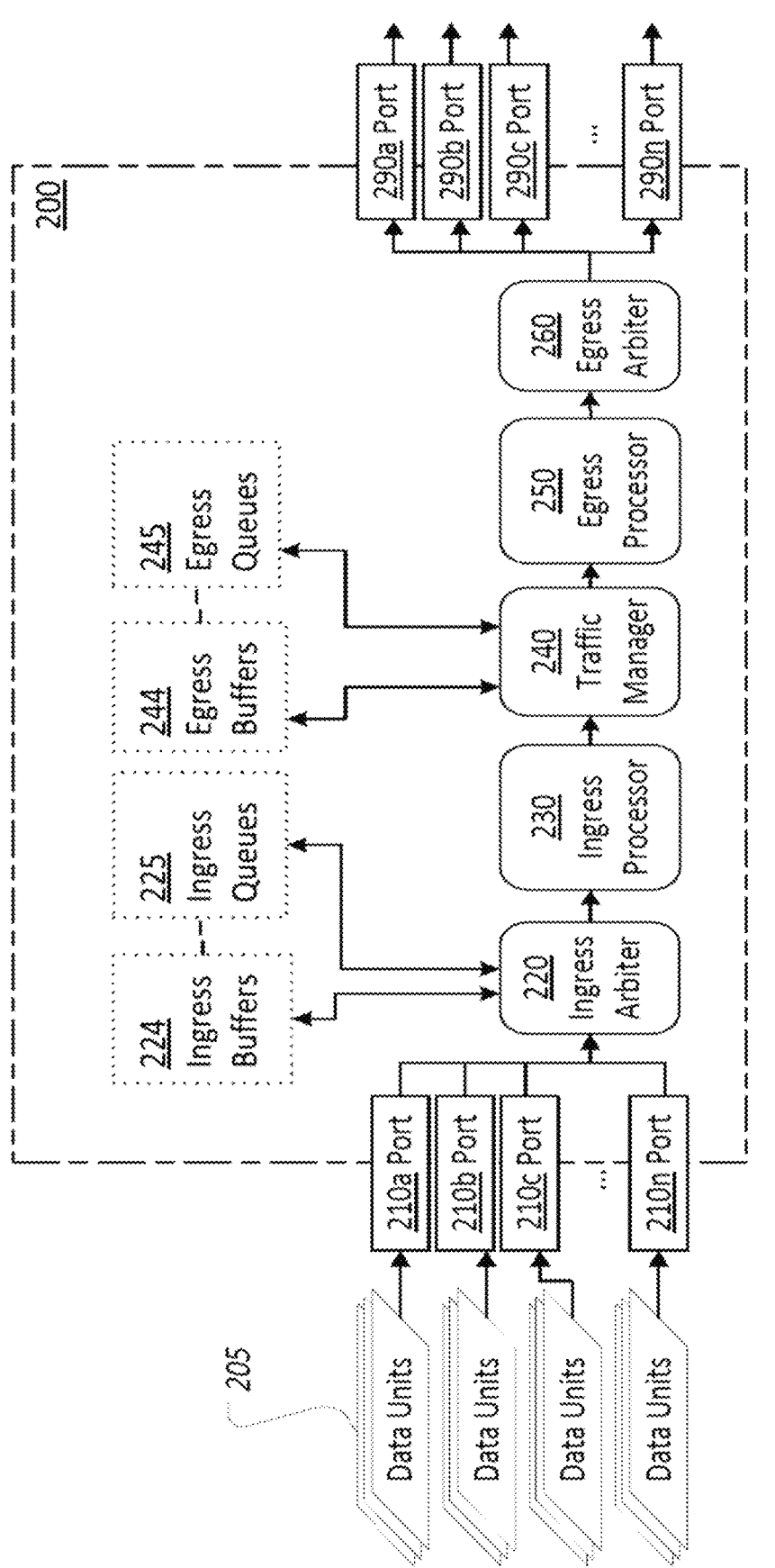
FIG. 2 illustrates an example network device.

FIG. 2 illustrates example aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network

100, by means of a series of operations performed at various components within the device 200. Note that, in an embodiment, some or all of the nodes 110 in system such as network 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through various subcomponents of the forwarding logic of device 200 is as follows. After being received via a port 210, a data unit 205 may be buffered in an ingress buffer 224 and queued in an ingress queue 225 by an ingress arbiter 220 until the data unit 205 can be processed by an ingress packet processor 230, and then delivered to an interconnect (or a cross connect) such as a switching fabric. From the interconnect, the data unit 205 may be forwarded to a traffic manager 240. The traffic manager 240 may store the data unit 205 in an egress buffer 244 and assign the data unit 205 to an egress queue 245. The traffic manager 240 manages the flow of the data unit 205 through the egress queue 245 until the data unit 205 is released to an egress packet processor 250. Depending on the processing, the traffic manager 240 may then assign the data unit 205 to another queue so that it may be processed by yet another egress processor 250, or the egress packet processor 250 may send the data unit 205 to an egress arbiter 260 which temporally stores or buffers the data unit 205 in a transmit buffer and finally forwards out the data unit via another port 290. Of course, depending on the embodiment, the forwarding logic may omit some of these subcomponents and/or include other subcomponents in varying arrangements.

Example components of a device 200 are now described in further detail.

2.4. Ports

Network device 200 includes ports 210/290. Ports 210, including ports 210-1 through 210-N, are inbound ("ingress") ports by which data units referred to herein as data units 205 are received over a network, such as network 110. Ports 290, including ports 290-1 through 290-N, are outbound ("egress") ports by which at least some of the data units 205 are sent out to other destinations within the network, after having been processed by the network device 200.

Egress ports 290 may operate with corresponding transmit buffers to store data units or subunits (e.g., packets, cells, frames, transmission units, etc.) divided therefrom that are to be transmitted through ports 290. Transmit buffers may have one-to-one correspondence relationships with ports 290, many-to-one correspondence with ports 290, and so on. Egress processors 250 or egress arbiters 260 operating with egress processors 250 may output these data units or subunits to transmit buffers before these units/subunits are transmitted out from ports 290.

Data units 205 may be of any suitable PDU type, such as packets, cells, frames, transmission units, etc. In an embodiment, data units 205 are packets. However, the individual atomic data units upon which the depicted components may operate may be actually be subunits of the data units 205. For example, data units 205 may be received, acted upon, and transmitted at a cell or frame level. These cells or frames—which may also be referred to as transfers—may be logically linked together as the data units 205 (e.g., packets, etc.) to which they respectively belong for purposes of determining how to handle the cells or frames. However, the subunits may not actually be assembled into data units 205 within device 200, particularly if the subunits are being forwarded to another destination through device 200.

Ports 210/290 are depicted as separate ports for illustrative purposes, but may actually correspond to the same physical hardware ports (e.g., network jacks or interfaces, etc.) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and a separate egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in some operational scenarios, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 230. On the other end, an egress packet processor 250 may input data units serially into another SerDes block, which outputs the data units in parallel to ports 290.

2.5. Packet Processors

A device 200 comprises one or more packet processing components that collectively implement forwarding logic by which the device 200 is configured to determine how to handle each data unit 205 that the device 200 receives. These packet processors components may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 230 and 250 may be configured to perform different packet processing tasks. These tasks may include, for example, identifying paths along which to forward data units 205, forwarding data units 205 to egress ports 290, implementing flow control and/or other policies, manipulating packets, performing statistical or debugging operations, and so forth. A device 200 may comprise any number of packet processors 230 and 250 configured to perform any number of processing tasks.

In an embodiment, the packet processors 230 and 250 within a device 200 may be arranged such that the output of one packet processor 230 or 250 may, eventually, be inputted into another packet processor 230 or 250, in such a manner as to pass data units 205 from certain packet processor(s) 230 and/or 250 to other packet processor(s) 230 and/or 250 in a sequence of stages, until finally disposing of the data units 205 (e.g., by sending the data units 205 out an egress port 290, "dropping" the data units 205, etc.). The exact set and/or sequence of packet processors 230 and/or 250 that process a given data unit 205 may vary, in some embodiments, depending on the attributes of the data unit 205 and/or the state of the device 200. There is no limit to the number of packet processors 230 and/or 250 that may be chained together in such a manner.

Based on decisions made while processing a data unit 205, a packet processor 230 or 250 may, in some embodiments, and/or for certain processing tasks, manipulate a data unit 205 directly. For instance, the packet processor 230 or 250 may add, delete, or modify information in a data unit header or payload. In other embodiments, and/or for other processing tasks, a packet processor 230 or 250 may generate control information that accompanies the data unit 205, or is merged with the data unit 205, as the data unit 205 continues through the device 200. This control information may then be utilized by other components of the device 200 to implement decisions made by the packet processor 230 or 250.

In an embodiment, a packet processor 230 or 250 need not necessarily process an entire data unit 205, but may rather only receive and process a subunit of a data unit 205 comprising header information for the data unit. For instance, if the data unit 205 is a packet comprising multiple cells, the first cell, or a first subset of cells, might be forwarded to a packet processor 230 or 250, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 230 or an egress packet processor 250. Generally, an ingress processor 230 resolves destinations for a traffic manager 240 to determine which ports 290 and/or queues a data unit 205 should depart from. There may be any number of ingress processors 230, including just a single ingress processor 230.

In an embodiment, an ingress processor 230 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 230 may be coupled directly or via various other components, such as an interconnect component.

The egress packet processor(s) 250 of a device 200, by contrast, may be configured to perform non-intake tasks necessary to implement the forwarding logic of the device 200. These tasks may include, for example, tasks such as identifying paths along which to forward the data units 205, implementing flow control and/or other policies, manipulating data units, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 or corresponding transmit buffers 280 for the ports 290 may be regulated via an egress arbiter coupled to the egress packet processor 250. In some embodiments, an egress processor 250 may also or instead be coupled to other potential destinations, such as an internal central processing unit, a storage subsystem, or a traffic manager 240.

2.6. Buffers

Since not all data units 205 received by the device 200 can be processed by component(s) such as the packet processor(s) 230 and/or 250 and/or ports 290 at the same time, various components of device 200 may temporarily store data units 205 in memory structures referred to as (e.g., ingress, egress, etc.) buffers while the data units 205 are waiting to be processed. For example, a certain packet processor 230 or 250 or port 290 may only be capable of processing a certain amount of data such as a certain number of data units 205, or portions of data units 205, in a given clock cycle, meaning that other data units 205, or portions of data units 205, destined for the packet processor 230 or 250 or port 290 must either be ignored (e.g., dropped, etc.) or stored. At any given time, a large number of data units 205 may be stored in the buffers of the device 200, depending on network traffic conditions.

A device 200 may include a variety of buffers, each utilized for varying purposes and/or components. Generally, a data unit 205 awaiting processing by a component is held in a buffer associated with that component until the data unit 205 is "released" to the component for processing.

Buffers may be implemented using any number of distinct banks of memory. Each bank may be a portion of any type of memory, including volatile memory and/or non-volatile memory. In an embodiment, each bank comprises many addressable "entries" (e.g., rows, columns, etc.) in which data units 205, subunits, linking data, or other types of data, may be stored. The size of each entry in a given bank is known as the "width" of the bank, while the number of entries in the bank is known as the "depth" of the bank. The number of banks may vary depending on the embodiment.

Each bank may have associated access limitations. For instance, a bank may be implemented using single-ported memories that may only be accessed once in a given time slot (e.g., clock cycle, etc.). Hence, the device 200 may be configured to ensure that no more than one entry need be read from or written to the bank in a given time slot. A bank may instead be implemented in a multi-ported memory to support two or more accesses in a given time slot. However, single-ported memories may be desirable in many cases for higher operating frequencies and/or reducing costs.

In an embodiment, in addition to buffer banks, a device may be configured to aggregate certain banks together into logical banks that support additional reads or writes in a time slot and/or higher write bandwidth. In an embodiment, each bank, whether logical or physical or of another (e.g., addressable, hierarchical, multi-level, sub bank, etc.) organization structure, is capable of being accessed concurrently with each other bank in a same clock cycle, though full realization of this capability is not necessary.

Some or all of the components in device 200 that utilize one or more buffers may include a buffer manager configured to manage use of those buffer(s). Among other processing tasks, the buffer manager may, for example, maintain a mapping of data units 205 to buffer entries in which data for those data units 205 is stored, determine when a data unit 205 must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer entry or entries should be utilized to store a given data unit 205, or portion thereof. In some embodiments, each data unit 205 is stored in a single entry. In yet other embodiments, a data unit 205 is received as, or divided into, constituent data unit portions for storage purposes. The buffers may store these constituent portions separately (e.g., not at the same address location or even within the same bank, etc.). The one or more buffer entries in which a data unit 205 are stored are marked as utilized (e.g., in a "free" list, free or available if not marked as utilized, etc.) to prevent newly received data units 205 from overwriting data units 205 that are already buffered. After a data unit 205 is released from the buffer, the one or more entries in which the data unit 205 is buffered may then be marked as available for storing new data units 205.

In some embodiments, the buffer assignment logic is relatively simple, in that data units 205 or data unit portions are assigned to banks and/or specific entries within those banks randomly or using a round-robin approach. In some embodiments, data units 205 are assigned to buffers at least partially based on characteristics of those data units 205, such as corresponding traffic flows, destination addresses, source addresses, ingress ports, and/or other metadata. For example, different banks may be utilized to store data units 205 received from different ports 210 or sets of ports 210. In an embodiment, the buffer assignment logic also or instead utilizes buffer state information, such as utilization metrics, to determine which bank and/or buffer entry to assign to a data unit 205, or portion thereof. Other assignment considerations may include buffer assignment rules (e.g., no writing two consecutive cells from the same packet to the same bank, etc.) and I/O scheduling conflicts, for example, to avoid assigning a data unit to a bank when there are no available write operations to that bank on account of other components reading content already in the bank.

2.7. Queues

In an embodiment, to manage the order in which data units 205 are processed from the buffers, various components of a device 200 may implement queueing logic. For example, the flow of data units through ingress buffers may be managed using ingress queues while the flow of data units through egress buffers may be managed using egress queues.

Each data unit 205, or the buffer locations(s) in which the data unit 205 is stored, is said to belong to one or more constructs referred to as queues. Typically, a queue is a set of memory locations (e.g., in the buffers, etc.) arranged in some order by metadata describing the queue. The memory locations may (and often are) non-contiguous relative to their addressing scheme and/or physical or logical arrangement. For example, the metadata for one queue may indicate that the queue is comprised of, in order, entry addresses 2, 50, 3, and 82 in a certain buffer.

In many embodiments, the sequence in which the queue arranges its constituent data units 205 generally corresponds to the order in which the data units 205 or data unit portions in the queue will be released and processed. Such queues are known as first-in-first-out ("FIFO") queues, though in other embodiments other types of queues may be utilized. In some embodiments, the number of data units 205 or data unit portions assigned to a given queue at a given time may be limited, either globally or on a per-queue basis, and this limit may change over time.

2.8. Traffic Management

According to an embodiment, a device 200 further includes one or more traffic managers 240 configured to control the flow of data units to one or more packet processor(s) 230 and/or 250. For instance, a buffer manager within the traffic manager 240 may temporarily store data units 205 in buffers as they await processing by egress processor(s)

250. A traffic manager 240 may receive data units 205 directly from a port 210, from an ingress processor 230, and/or other suitable components of device 200. In an embodiment, the traffic manager 240 receives one TDU from each possible source (e.g. each port 210, etc.) each clock cycle or other time slot.

Traffic manager 240 may include or be coupled to egress buffers for buffering data units 205 prior to sending those data units 205 to their respective egress processor(s) 250. A buffer manager within the traffic manager 240 may temporarily store data units 205 in egress buffers as they await processing by egress processor(s) 250. The number of egress buffers may vary depending on the embodiment. A data unit 205 or data unit portion in an egress buffer may eventually be "released" to one or more egress processor(s) 250 for processing, by reading the data unit 205 from the (e.g., egress, etc.) buffer and sending the data unit 205 to the egress processor(s) 250. In an embodiment, traffic manager 240 may release up to a certain number of data units 205 from buffers to egress processors 250 each clock cycle or other defined time slot.

Beyond managing the use of buffers to store data units 205 (or copies thereof), a traffic manager 240 may include queue management logic configured to assign buffer entries to queues and manage the flow of data units 205 through the queues. The traffic manager 240 may, for instance, identify a specific queue to assign a data unit 205 to upon receipt of the data unit 205. The traffic manager 240 may further determine when to release—also referred to as "dequeuing"—data units 205 (or portions thereof) from queues and provide those data units 205 to specific packet processor(s) 250. Buffer management logic in the traffic manager 240 may further "deallocate" entries in a buffer that store data units 205 are no longer linked to the traffic manager's queues. These entries are then reclaimed for use in storing new data through a garbage collection process.

In an embodiment, different queues may exist for different destinations. For example, each port 210 and/or port 290 may have its own set of queues. The queue to which an incoming data unit 205 is assigned and linked may, for instance, be selected based on forwarding information indicating which port 290 the data unit 205 should depart from. In an embodiment, a different egress processor 250 may be associated with each different set of one or more queues. In an embodiment, the current processing context of the data unit 205 may be used to select which queue a data unit 205 should be assigned to.

In an embodiment, there may also or instead be different queues for different flows or sets of flows. That is, each identifiable traffic flow or group of traffic flows is assigned its own set of queues to which its data units 205 are respectively assigned. In an embodiment, different queues may correspond to different classes of traffic or quality-ofservice (QOS) levels. Different queues may also or instead exist for any other suitable distinguishing properties of the data units 205, such as source address, destination address, packet type, and so forth.

Device 200 may comprise any number (e.g., one or more, etc.) of packet processors 230 and/or 250 and traffic managers 240. For instance, different sets of ports 210 and/or ports 290 may have their own traffic manager 240 and packet processors 230 and/or 250. As another example, in an embodiment, the traffic manager 240 may be duplicated for some or all of the stages of processing a data unit. For example, system 200 may include a traffic manager 240 and egress packet processor 250 for an egress stage performed upon the data unit 205 exiting the system 200, and/or a traffic manager 240 and packet processor 230 or 250 for any number of intermediate stages. The data unit 205 may thus pass through any number of traffic managers 240 and/or packet processors 230 and/or 250 prior to exiting the system 200. In other embodiments, only a single traffic manager 240 is needed. If intermediate processing is needed, flow of a data unit 205 may "loop back" to the traffic manager 240 for buffering and/or queuing after each stage of intermediate processing.

In an embodiment, a traffic manager 240 is coupled to the ingress packet processor(s) 230, such that data units 205 (or portions thereof) are assigned to buffers only upon being initially processed by an ingress packet processor 230. Once in an egress buffer, a data unit 205 (or portion thereof) may be "released" to one or more egress packet processor(s) 250 for processing, either by the traffic manager 240 sending a link or other suitable addressing information for the corresponding buffer to the egress packet processor 250, or by sending the data unit 205 directly.

In the course of processing a data unit 205, a device 200 may replicate a data unit 205 one or more times—for example, based on a copy count specified in control information for the data unit—for multi-destination purposes such as, without limitation, multicasting, mirroring, recirculation, debugging, and so forth. For example, a single data unit 205 may be replicated to multiple egress queues. For instance, a data unit 205 may be linked to separate queues for each of ports 1, 3, and 5. As another example, a data unit 205 may be replicated a number of times after it reaches the head of a queue (e.g., for different egress processors 250, etc.). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual copy of the data unit 205 in buffers, or a single copy of the data unit 205 may be linked from a single buffer location to multiple queues at the same time.

2.9. Forwarding Logic

The logic by which a device 200 determines how to handle a data unit 205—such as where and whether to send a data unit 205, whether to perform additional processing on a data unit 205, etc. —is referred to as the forwarding logic of the device 200. This forwarding logic is collectively implemented by a variety of the components of the device 200, such as described above. For example, an ingress packet processor 230 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments when the ingress packet processor 230 performs edits as well.

The forwarding logic may be hard-coded and/or configurable, depending on the embodiment. For example, the forwarding logic of a device 200, or portions thereof, may, in some instances, be at least partially hard-coded into one or more ingress processors 230 and/or egress processors 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g., are directed to, etc.) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g., utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers are overutilized, a queue is over a certain size, and/or a data unit 205 has a certain characteristic.

2.10. Multi-Stage Scheduler

Figure 3A:
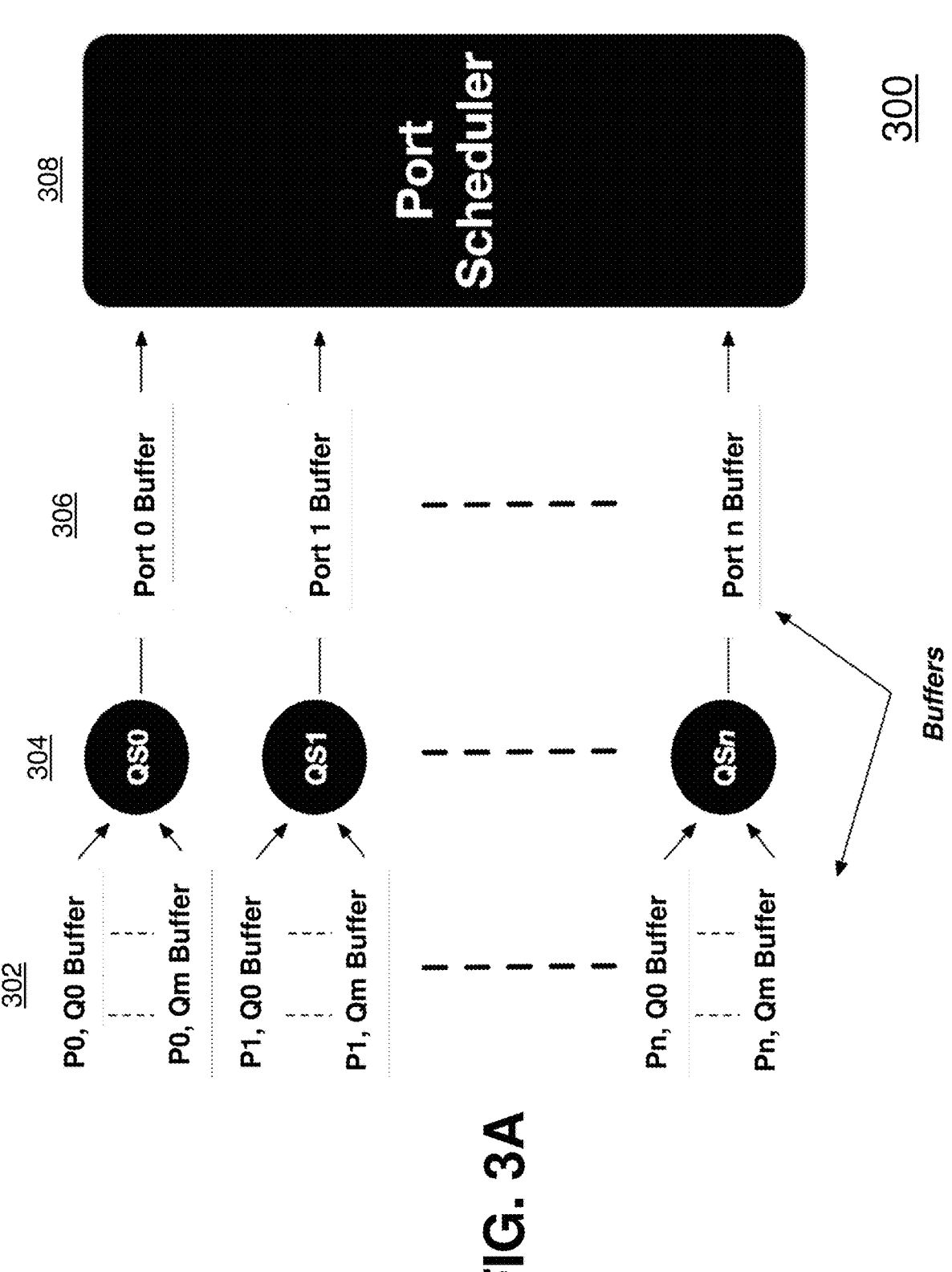
FIG. 3A illustrates an example multi-stage scheduler.

FIG. 3A illustrates an example multi-stage scheduler 300 in a network node or switch to schedule and select network/data packets for transmission or transfer operations by way of a plurality of ports in the network node/switch. The multi-stage scheduler 300 comprises a port scheduler 308, a plurality of port selection buffers 306 (denoted as "Port 0 Buffer," "Port 1 Buffer," . . . "Port n Buffer") for the plurality of ports, a plurality of queue schedulers 304 (denoted as "QS0", "QS1" . . . "QSn") for the plurality of ports or port selection buffers, a plurality of groups of queue selection buffers 302 (denoted as "P0, Q0 Buffer," . . . "P0, Qm Buffer," "P1, Q0 Buffer," . . . "P1, Qm Buffer," . . . "Pn, Q0 Buffer," . . . "Pn, Qm Buffer") from which the queue schedulers 304 select or dequeue network/data packets for further enqueuing or buffering into the plurality of port selection buffers 306, etc. In some operational scenarios, some or all of these modules, devices, systems, etc., in FIG. 3A may be in part or in whole implemented by a network or packet switch device as described herein. In some operational scenarios, some or all of these modules, devices, systems, etc., in FIG. 3A may be in part or in whole implemented by a network or packet switch device as described herein. Each block, module, device, system, etc., illustrated in the multi-stage scheduler 300 may be collectively or individually implemented with one or more components, sub-systems or devices that comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The multi-stage scheduler 300 comprises a port scheduler that selects or dequeues—e.g., in realtime or near realtime, at each CPU cycle or each reference clock cycle-specific network/data packets from the plurality of port selection buffers for the plurality of ports. Each port selection buffer in the plurality of port selection buffers may be set up or maintained for a respective port in the plurality of ports to be used for selecting, buffering, storing, enqueuing or dequeuing sets of packet data for sets of network/data packets to be transmitted or transferred through the respective port.

The multi-stage scheduler 300 comprises a plurality of queue schedulers that select or dequeue—e.g., in realtime or near realtime, at each CPU cycle or each reference clock cycle—specific network/data packets from the plurality of groups of queue selection buffers for the plurality of ports. Each group of selection buffers in the plurality of groups of queue selection buffers may be set up or maintained—by a respective queue scheduler in the plurality of queue schedulers—for a respective port in the plurality of ports to be used for selecting, buffering, storing, enqueuing or dequeuing sets of packet metadata for sets of network/data packets to be further enqueued, stored or buffered in the port selection buffer of the respective port.

For example, a first group of selection buffers ("P0, Q0 Buffer," . . . "P0, Qm Buffer") may be set up or maintained—by a first queue scheduler ("QS0") —for a first port ("Port 0") to be used for selecting, buffering, storing, enqueuing or dequeuing sets of packet metadata for sets of network/data packets to be further enqueued, stored or buffered in a first port selection buffer ("Port 0 Buffer") of the first port ("Port 0"). A second group of selection buffers ("P1, Q0 Buffer," . . . "P1, Qm Buffer,") may be set up or maintained—by a second queue scheduler ("QS1") —for a second port ("Port 1") to be used for selecting, buffering, storing, enqueuing or dequeuing sets of packet metadata for sets of network/data packets to be further enqueued, stored or buffered in a second port selection buffer ("Port 1 Buffer") of the second port ("Port 1"). The (n+1)-th group of selection buffers ("Pn, Q0 Buffer," . . . "Pn, Qm Buffer,") may be set up or maintained—by the (n+1)-th queue scheduler ("QSn") —for the (n+1)-th ("Port n") to be used for selecting, buffering, storing, enqueuing or dequeuing sets of packet metadata for sets of network/data packets to be further enqueued, stored or buffered in the (n+1)-th port selection buffer ("Port n Buffer") of the (m+1)-th port ("Port n").

2.11. Miscellaneous

Device 200 or multi-stage scheduler 300 therein illustrate only one of many possible arrangements of devices or schedulers configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100.

Furthermore, figures herein illustrate but a few of the various arrangements of memories that may be utilized to implement the described buffering techniques. Other arrangements may include fewer or additional elements in varying arrangements.

3.0. Functional Overview

Described in this section are various example method flows or operations for implementing various features of the systems and system components described herein. The example method flows are non-exhaustive. Alternative method flows and flows for implementing other features will be apparent from the disclosure.

The various elements of the process flows or operations described below may be performed in a variety of systems. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Port and Queue Scheduling

Under techniques as described herein, sets of packet metadata may be generated for (e.g., received, input, etc.) incoming packets in queues of a port and buffered/stored in queue selection buffers associated of the (e.g., ingress, egress, etc.) port of a network node/switch. Sets of packet data may be generated for (e.g., selected, output, to-be-forwarded, etc.) outgoing packets in a port selection buffer associated with the port.

At a selection clock cycle, while a port scheduler of the network node/switch selects a subset of the sets of packet data corresponding to a subset of the outgoing packets from the port selection buffer, a queue scheduler for packet queues set up for the port of the network node/switch can concurrently select a subset of the sets of packet metadata corresponding to a subset of the incoming packets from among the sets of packet metadata buffered/stored in the queue selection buffers. Second sets of packet data may be derived, generated or determined by the queue scheduler, based on the subsets of sets of packet metadata, for second outgoing packets corresponding to the subset of the incoming packets. These second sets of packet data can be concurrently buffered/stored by the queue scheduler in the port selection buffer of the port at the same clock cycle.

3.2. Port or Queue Eligibility

A port scheduler as described herein performs port scheduling operations in the network node/switch to arbitrate access or allocation to overall (e.g., egress, ingress, transfer, transmission, 1 Tbps or more, 400 Mbps, 100 Mbps, etc.) bandwidth across some or all eligible (e.g., egress, ingress, physical, logical, etc.) ports of the network node/switch. The port scheduler may use a set of scheduling eligibility criteria for ports (also referred to as "port eligibility criteria") to determine whether a port is eligible for selecting—and further performing transmission or transfer operations on—packets from a port selection buffer. These port eligibility criteria may include, but are not necessarily limited to only, any, some or all (or any combination) of: not being shaped below a maximum transmission rate (e.g., measured in numbers of bits, bytes or packets, etc.) or rated limited or prevented from transmission or transfer in accordance with an applicable port profile or configuration setting or operational state; not being flow controlled or paused; having transmission credits, for example signaled from downstream devices based on available downstream resources on these downstream devices; having at least one eligible queue among all queues of the port; and so forth.

A queue scheduler as described herein may be configured for each specific port in some or all ports of the network node/switch and performs queue scheduling operations in the network node/switch to arbitrate access or allocation to overall port-specific (e.g., egress, ingress, transfer, transmission, etc.) bandwidth across some or all eligible queues in a plurality of (e.g., 2, 4, 8, 12, etc.) queues of the specific port of the network node/switch. Different ports of the network node/switch may be configured with the same or different number(s) of queues. The queue scheduler may use a second set of scheduling eligibility criteria for queues of the port (also referred to as "queue eligibility criteria") to determine whether a queue is eligible for selecting—and further performing buffering operations with the port selection buffer of the port on—packets from a queue selection buffer. These queue eligibility criteria may include, but are not necessarily limited to only, any, some or all (or any combination) of: not being shaped or rated limited below an applicable or specified maximum rate or prevented from transmission or transfer in accordance with an applicable queue profile or configuration setting or operational state; not being flow controlled (e.g., priority-based flow control or PFC, when higher priority flows in the port are currently being served, etc.) or prevented from transmission or transfer; having non-negative credit deficits, for example under a weighted-deficit-round-robin (WDRR) or weighted-round-robin (WRR) scheduling policy or implementation; being presently not empty; the queue not previously or last selected; and so on. In some operational scenarios, the queue scheduler may be implemented to select a packet and not to switch context till all selections relating to the packet are completed. In some other operational scenarios, the queue scheduler may be implemented to select multiple packet and switch contexts without waiting for all selections relating to a particular packet to be completed.

Different (e.g., end-user, non-user, etc.) traffic types such as video, data center traffic, etc. may be rate limited or shaped differently. In some operational scenarios, a data or transmission rate to a particular processor or device or server in a data center may be specifically rate limited or shaped, differently from other data/transmission rates to different processors or different devices or different servers in the same data center.

Flow control as described herein may, but is not necessarily limited to only, be based on priority, for example strict priority. Flow control (PFC) from downstream applications receiving traffic flows. May depend on particular scheduling load. Credit deficits may be used to allocate or assign a weighted bandwidth distribution to different queues or corresponding traffic flows, for example using tokens and/or thresholds under a WDRR queue scheduling policy or discipline. A negative credit deficit for a queue or corresponding traffic flow leads to the queue or traffic flow to be determined as ineligible for queue selection.

3.3. Work Conserving

Some or all schedulers as described herein such as a port or queue scheduler may be implemented as a work-conserving scheduler, which seeks to keep the scheduled resource(s)—whose access(es) are being arbitrated by the scheduler—busy or to make use of the resource(s) at every clock cycle. Hence, in response to determining that there are eligible packets for a packet selection (or dequeue), such a work-conserving scheduler does not keep the resource(s) unused or idle (e.g., not making use of the resource(s), etc.) but rather selects or dequeue some or all of the eligible packets for further operations that make use of the resource(s).

Techniques as described herein can be implemented to ensure that a port is not idle and ready to send packets with minimized latency when its queues contain packets or cells thereof, even when its port speed is relatively high such as one or more hundreds of megabits-per-second (Mbps), one or more terabits-per-second (Tbps), and so on. For such a port, the time between the arrival of a packet and the transmission of the packet needs to be relatively low, such as a few nanoseconds for small packet sizes or even shorter.

To minimize time or latency for relatively high speed/bandwidth operations, the scheduler may maintain or keep available the latest statues relating to packet queuing/dequeuing operations at all time or clock cycles in runtime. The statuses maintained by the scheduler to facilitate the high speed/bandwidth operations may include (at any given time or clock cycle): whether a dequeue of the current scheduled cell or transfer of a packet from a queue and/or port selection buffer will result in the queue and/or port selection buffer becoming empty; whether the current scheduled cell or transfer represents the final transfer (e.g., end-of-packet or EOP, etc.) for the packet; and so on.

A multi-stage scheduler that includes a port scheduler operating with a plurality of queue schedulers can be used to support relatively high speed and low latency packet transmission or transfer operations. These schedulers can fetch or dequeue buffer entries corresponding to network/data packets in their respective selection buffers independently. For example, while the port scheduler its timing loop selects, fetches or dequeues ports or specific port selection buffer entries from (e.g., the heads of, etc.) corresponding port selection buffers for transmission or transfer, some or all of the queue schedulers in respective separate and independent timing loops can concurrently select, fetch or dequeue specific queue selection buffer entries from (the heads of)

queue selection buffers for further enqueuing into (e.g., the tails, etc.) the port selection buffers. Under techniques as described herein, timing loops associated with resolving port and/or queue states are decoupled from one another. The port selection buffers can be readily without any waiting used to store selections (e.g., at the tails of the port selection buffers, etc.) made by the queue schedulers while the same port selection buffers—or eligible non-empty port selection buffers—can be readily without any waiting used by the port scheduler to select packets for transmission or transfer operations. The timing loops for port and queue scheduling operations may operate at a single relatively high clock rate or alternatively may operate at two or more different clock rates. For example, port scheduling operations may be implemented to support a relatively high clock rate as compared with a clock rate at which queuing scheduling operations.

3.4. Queue Selection Data Flows

Figure 3B:
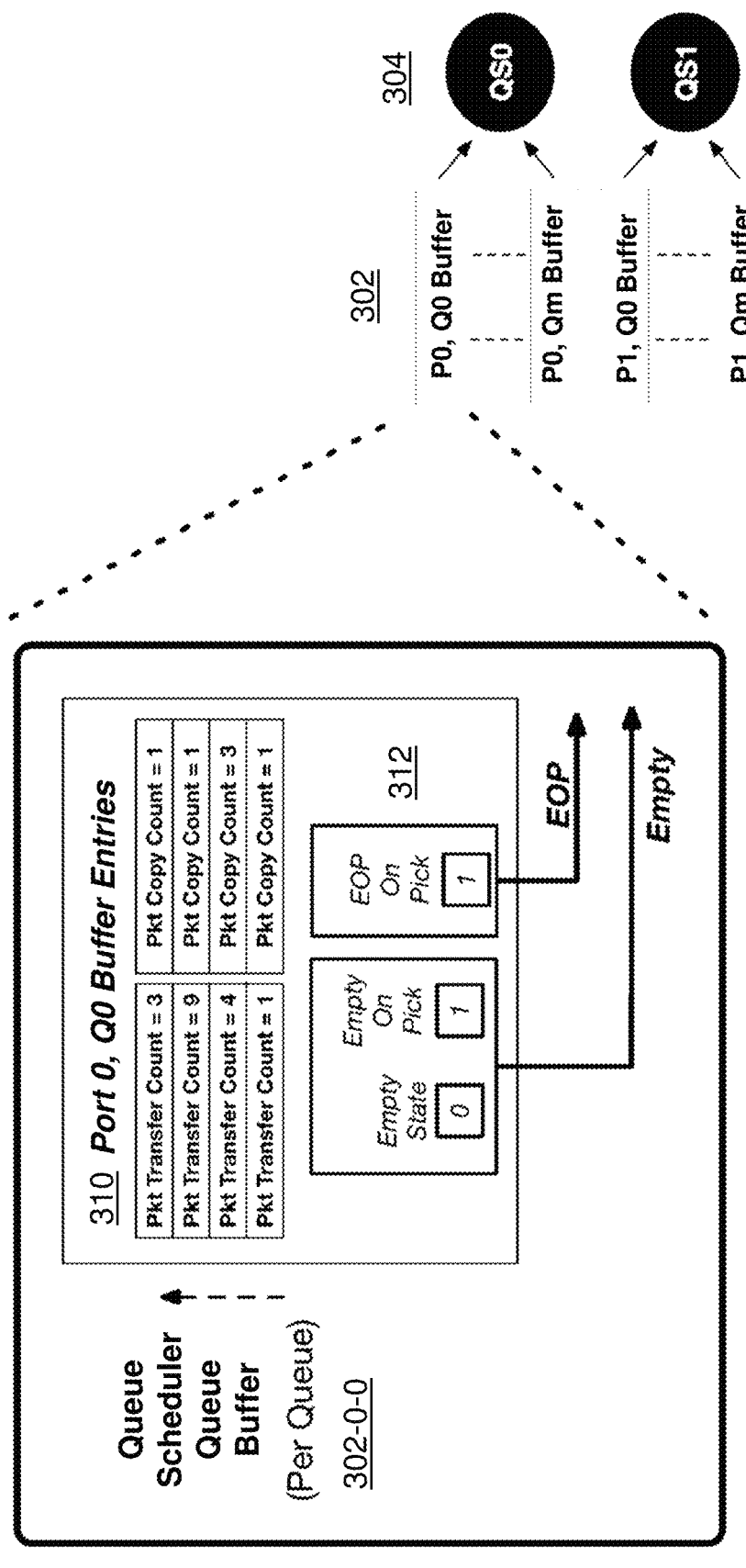
FIG. 3B illustrates example data flows.

FIG. 3B illustrates example data flows in connection with a group of queue selection buffers (e.g., "Port 0, Q0 Buffer," "Port 0, Qm Buffer," etc.) in a plurality of groups of queue selection buffers 302 and a queue scheduler (e.g., "QS0", etc.) in a plurality of queue schedulers 304 for a port (e.g., "Port 0." etc.) in a plurality of ports in a network node/switch.

A plurality of groups of (e.g., egress, ingress, 245 of FIG. 2, 225 of FIG. 2, etc.) queues may be set up or maintained in the network node/switch for the plurality of ports in the network node/switch. Each group of queues in the plurality of groups of queues may be set up or maintained for a respective port in the plurality of ports. For example, a group of queues in the plurality of groups of queues may be set up for the port ("Port 0") in the plurality of ports for enqueuing and dequeuing network/data packets waiting to be transmitted or transferred through the port ("Port 0").

Each queue in the group of queues set up or maintained for the port ("Port 0") may (e.g., 1-1, etc.) correspond to a respective queue selection buffer in the group of queue selection buffers for the port ("Port 0").

For example, a queue in the group of queues may correspond to the queue selection buffer 302-0-0 ("Port 0, Q0 Buffer") in the group of queue selection buffers for the port ("Port 0"). The queue may comprise a set of queue entries each of which may correspond to a set of network/data packets—which may be referred to as network/data packets enqueued in the queue—to be transmitted or transferred through the port ("Port 0"). A subset of (e.g., the first few at the head of the queue, the highest priority, etc.) network/data packets may be selected from the queue and enqueued into the queue selection buffer 302-0-0 ("Port 0, Q0 Buffer") corresponding to the queue.

The queue scheduler ("QS0") selects or dequeues—e.g., in realtime or near realtime, at each CPU cycle or each reference clock cycle—specific network/data packets from the group of queue selection buffers for the ("Port 0"). The specific network/data packets selected by the queue scheduler ("QS0") from the group of queue selection buffers are further buffered, stored or enqueued by the queue scheduler ("QS0") in a corresponding port selection buffer ("Port 0 Buffer") of the port ("Port 0"). As compared with a queue in the group of queues for the port ("Port 0"), a subset of packets in all packets in the queue can have packet metadata/information stored or buffered in a corresponding queue selection buffer for the queue for fast access—for example, selections can be made with respect to a relatively small subset of packets rather than all the packets in the queue.

Hence, the group of queue selection buffers for the port can be used by the network node/switch to overcome memory read latencies to fetch next packet(s) for transmission or transfer operations via the port.

For example, the queue scheduler ("QS0") can select or dequeue—e.g., in realtime or near realtime, at each CPU cycle or each reference clock cycle-one or more network/data packets from network/data packets represented or enqueued in the queue selection buffer 302-0-0 ("Port 0, Q0 Buffer") and further buffer/store/enqueue these selected/dequeued network/data packets from the queue selection buffer ("Port 0, Q0 Buffer") in the port selection buffer ("Port 0 Buffer") of the port ("Port 0").

As illustrated in FIG. 3B, the queue selection buffer ("P0, Q0 Buffer") in the group of queue selection buffers ("P0, Q0 Buffer" . . . "P0, Qm Buffer") corresponding to the queue scheduler ("QS0") may include a set of buffer entries 310 (denoted as "Port 0, Q0 Buffer Entries") in a specific order represented by the vertical broken arrow in FIG. 3B. The set of buffer entries 310 may correspond to or specify a set of network/data packets presently buffered/stored/enqueued in the queue selection buffer ("P0, Q0 Buffer").

Packet/cell specific queue control information may be included in packet metadata of a packet or a cell thereof stored in a queue selection buffer entry as described herein to drive or facilitate (e.g., internal, etc.) operations of a queue scheduler. The packet/cell specific queue control information may include, but is not necessarily limited to only: one or more data addresses along with any additional metadata relating to this packet. For example, a multicast packet may be indicated or specified in the packet/cell specific queue control information by way of a value of a packet copy count greater than one (1). Additional information or packet metadata such as a cell/transfer count, packet/cell/transfer size(s), etc., may also be indicated or specified in the packet/cell specific queue control information.

Hence, there is no need to store all packet data or information of a network/data packet in a buffer entry—as described herein in the queue selection buffer ("P0, Q0 Buffer") —corresponding to the packet. Instead, a set of packet metadata, of a relatively small data size as compared with the data size of the packet, relating to the network/data packet may be stored or maintained in the buffer entry. The set of packet metadata stored in the buffer entry for the corresponding packet may include some or all packet control data or packet data relating to the packet such as packet (pkt) transfer count, packet copy count, etc. The packet copy count in the set of packet metadata for the network/data packet refers to the (e.g., total, total remaining, etc.) number of packet copies of the network/data packet to generate and/or transfer for the network/data packet. The packet transfer count in the set of packet metadata for the network/data packet refers to the (e.g., total, total remaining, etc.) number of scheduler selections to perform for each of the packet copies of the network/data packet.

The network/data packet may be transmitted or transferred in or with one or more cells or transfers derived from the network/data packet; each of the cells or transfers of the network/data packet carries a corresponding portion of packet data in the network/data packet. The number of scheduler selections stored in the buffer entry correspond to or represent the number of cells or transfers of the network/data packet. Each scheduler selection of the scheduler selections corresponds to or represents a respective cell of the cells or transfers of the network/data packet.

The set of packet metadata may include additional packet information or data to facilitate selection or dequeuing operations. A dequeuing of the network/data packet from the queue selection buffer ("P0, Q0 Buffer") or from the corresponding queue occurs when all the scheduler selections of each of the packet copies of the network/data packet have been made by the queue scheduler ("QS0").

As illustrated in FIG. 3B, the buffer entries 310 in the queue selection buffer 302-0-0 ("P0, Q0 Buffer") presently may buffer or store four sets of packet metadata for four network/data packets, respectively. The first buffer entry—or the head of the buffer entries in the queue selection buffer 302-0-0 ("P0, Q0 Buffer") —may store the first set of packet metadata ("Pkt Transfer Count=3" and "Pkt Copy Count=1") for the first of the four network/data packets. The second buffer entry—or the next of the buffer entries in the queue selection buffer 302-0-0 ("P0, Q0 Buffer") —may store the second set of packet metadata ("Pkt Transfer Count=9" and "Pkt Copy Count=1") for the second of the four network/data packets. The third buffer entry of the buffer entries in the queue selection buffer 302-0-0 ("P0, Q0 Buffer") may store the third set of packet metadata ("Pkt Transfer Count=4" and "Pkt Copy Count=3") for the third of the four network/data packets. The fourth buffer entry—or the tail of the buffer entries in the queue selection buffer 302-0-0 ("P0, Q0 Buffer") —may store the fourth set of packet metadata ("Pkt Transfer Count=1" and "Pkt Copy Count=1") for the fourth or last of the four network/data packets.

3.5. Queue States

As illustrated in FIG. 3B, in addition to the buffer entries 310 ("Port 0, Q0 Buffer Entries"), the queue selection buffer 302-0-0 ("Port 0, Q0 Buffer") may be used to store queue selection information/data 312. The queue selection information/data 312 in the queue selection buffer 302-0-0 ("Port 0, Q0 Buffer") may include, but is not necessarily limited to only, any, some or all of: an empty state, an empty-on-pick state, an EOP-on-pick state, etc.

The empty state may be set and/or used by the queue scheduler ("QS0") to determine (e.g., at a given CPU or clock cycle, etc.) whether the queue from which a subset of network/data packets is selected to have packet metadata stored in the buffer entries 310 ("Port 0, Q0 Buffer Entries") of the queue selection buffer 302-0-0 ("Port 0, Q0 Buffer") is currently empty.

The empty-on-pick state may be set and/or used by the queue scheduler ("QS0") to determine (e.g., at a given CPU or clock cycle, etc.) whether a current selection of a network/data packet or of a cell/transfer of the packet to be made by the queue scheduler ("QS0") from the queue selection buffer 302-0-0 ("Port 0, Q0 Buffer") is to cause the queue or its empty state to transition to be empty or true.

The EOP-on-pick state may be set and/or used by the queue scheduler ("QS0") to determine (e.g., at a given CPU or clock cycle, etc.) whether the current selection of the network/data packet or of the cell/transfer of the packet to be made by the queue scheduler ("QS0") from the queue selection buffer 302-0-0 ("Port 0, Q0 Buffer") is to cause the final or last transfer for the packet to occur or is to reach the end-of-packet (EOP) for the packet.

For example, a packet that carries 9 kilobytes in its payload may be partitioned or divided into 9 separate payload portions respectively carried in 9 cells or transfers. In scheduling operations performed by a queue scheduler as described herein on a first queue or a corresponding first queue selection buffer in a plurality of queues or queue selection buffers for a port, the queue scheduler can determine whether the currently selected cell or transfer of the packet is the second last cell or transfer of the packet to be selected from the first queue or queue selection buffer and to be transmitted or transferred by the port. If it is determined so, the queue scheduler can set the EOP-on-pick state to be true and proceed to give selection preference to the packet by selecting the last cell or transfer of the packet in the next clock cycle instead of another cell/transfer of another packet. On the other hand, if it is not determined so, the queue scheduler can set or keep the EOP-on-pick state to be false and proceed to select a cell or transfer of one of the packet or other packets in the queue or queue selection buffers in the next clock cycle instead of giving selection preference to the packet based on the EOP-on-pick state. As a result, the packet or the entire payload thereof can be transmitted or transferred relatively fast than otherwise through the port.

Additionally, optionally or alternatively, in scheduling operations performed by a queue scheduler as described herein on a first queue or a corresponding first queue selection buffer in a plurality of queues or queue selection buffers for a port, the queue scheduler can determine whether the currently selected packet is the last packet to be selected from the first queue or queue selection buffer and to be transmitted or transferred by the port. If it is determined so, the queue scheduler can set the empty-on-pick state to be true. The queue scheduler can readily (or without waiting) go to the next eligible queue in the next clock cycle to avoid inadvertently servicing an empty queue or queue selection buffer (starvation) and to fail to select or produce a packet or cell thereof for the port in the next clock cycle. On the other hand, if it is not determined so, the queue scheduler can set or keep the empty-on-pick state to be false. The queue scheduler can go to one of the same eligible queue or any of other eligible queues (all non-empty with empty-on-pick states to be false) in the next clock cycle.

As a result of using these states in queue scheduling operations, the queue scheduler for the port can be used or implemented to keep port transmission (active or without starvation) for the port. This can help prevent or significantly reduce time latency in packet transmission/transfer operations including but not limited to those related to batch transfers, multiple packet grouping, multiple selection grouping operations, and so on.

3.6. Queue Selection Policies

Each of the queue schedulers can implement one or more queue selection policies, for example set forth in a queue scheduler configuration for the queue scheduler. By way of illustration but not limitation, each of some or all queues in the group of queues for the port ("Port 0") may be assigned a (queue) servicing discipline that defines a scheduling order among the network/data packets represented in the queue. Examples of the scheduling order may include, but are not necessarily limited to only, any of: strict priority, weighted deficit round-robin or WDRR, weighted fair queueing or WFQ, etc.

Additionally, optionally or alternatively, each of some or all queues in the group of queues for the port ("Port 0") may be assigned a respective minimum bandwidth (MinBW) guarantee to ensure that the queue receives at least the assigned minimum amount of bandwidth (avoids starvation) from the multi-stage scheduler (if the queue supplies or contains a sufficient amount of packet data for transmission or transfer that is above what can be supported by the respective minimum amount of bandwidth).

Additionally, optionally or alternatively, each of some or all queues in the group of queues for the port ("Port 0") may be assigned a respective maximum bandwidth (MaxBW) limit to ensure that the (total or accumulated) amount of bandwidth provided by the multi-stage scheduler for the queue to consume is limited to, or does not exceed, the specified maximum bandwidth.

In some operational scenarios, a queue scheduler as described herein may maintain or keep track of one or more (queue scheduler) servicing lists. Separate or different servicing lists may be used to bin or group different combinations or different subsets of queues in the group of queues for the port. Some or all of the servicing lists maintained by the queue scheduler may be set, configured, specified or defined based on one or more configured attributes of any, some or all of the queues in the group of queues for the port. Some or all of the servicing lists can be used by the queue scheduler to establish or determine a specific servicing order in which the queue scheduler services queues in the group of queues or services queue selection buffers in the group of queue selection buffers corresponding to the group of queues.

In some operational scenarios, the queue scheduler service lists may include a minBW servicing list that specifies respective minimum bandwidths for the queues. The minBW servicing list may be serviced first by the queue scheduler to determine a specific list of eligible queues whose minBW guarantees have not been satisfied and to seek to make selections for the purpose of satisfying these minBW guarantees. The eligible queues in the specific list may be serviced in a (e.g., packet-level rather than cell-level, etc.) round-robin order.

In some operational scenarios, the queue scheduler service lists may include a strict priority (SP) servicing list that specifies or sets forth a strict priority (SP) servicing/scheduling discipline for serving eligible queues in the group of queues managed by the queue scheduler. The SP servicing list may be serviced by the queue scheduler to determine a specific priority order among the eligible queues and to make selections from the eligible queues in the specific priority order (e.g., priority (M−1) down to priority 0, etc.). The SP servicing list may be serviced in response to determining that the minBW servicing list is empty (or all queues having met their respective minBW guarantees).

In some operational scenarios, the queue scheduler service lists may include a WDRR servicing list that specifies or sets forth a WDRR servicing/scheduling discipline for serving eligible queues in the group of queues managed by the queue scheduler. The WDRR servicing list may be serviced by the queue scheduler to make selections from the eligible queues in a (e.g., packet-level, etc.) round-robin order. The WDRR servicing list may be serviced last in response to determining that both the minBW servicing list and the SP servicing list are empty (or all queues having met their respective minBW guarantees AND all the strict priority queues having been served).

In some operational scenarios, the same queue may appear on multiple service lists. For example, the queue may appear on both the minBW servicing list and the WDRR servicing list.

3.7. Selection Operations

Figure 3C:
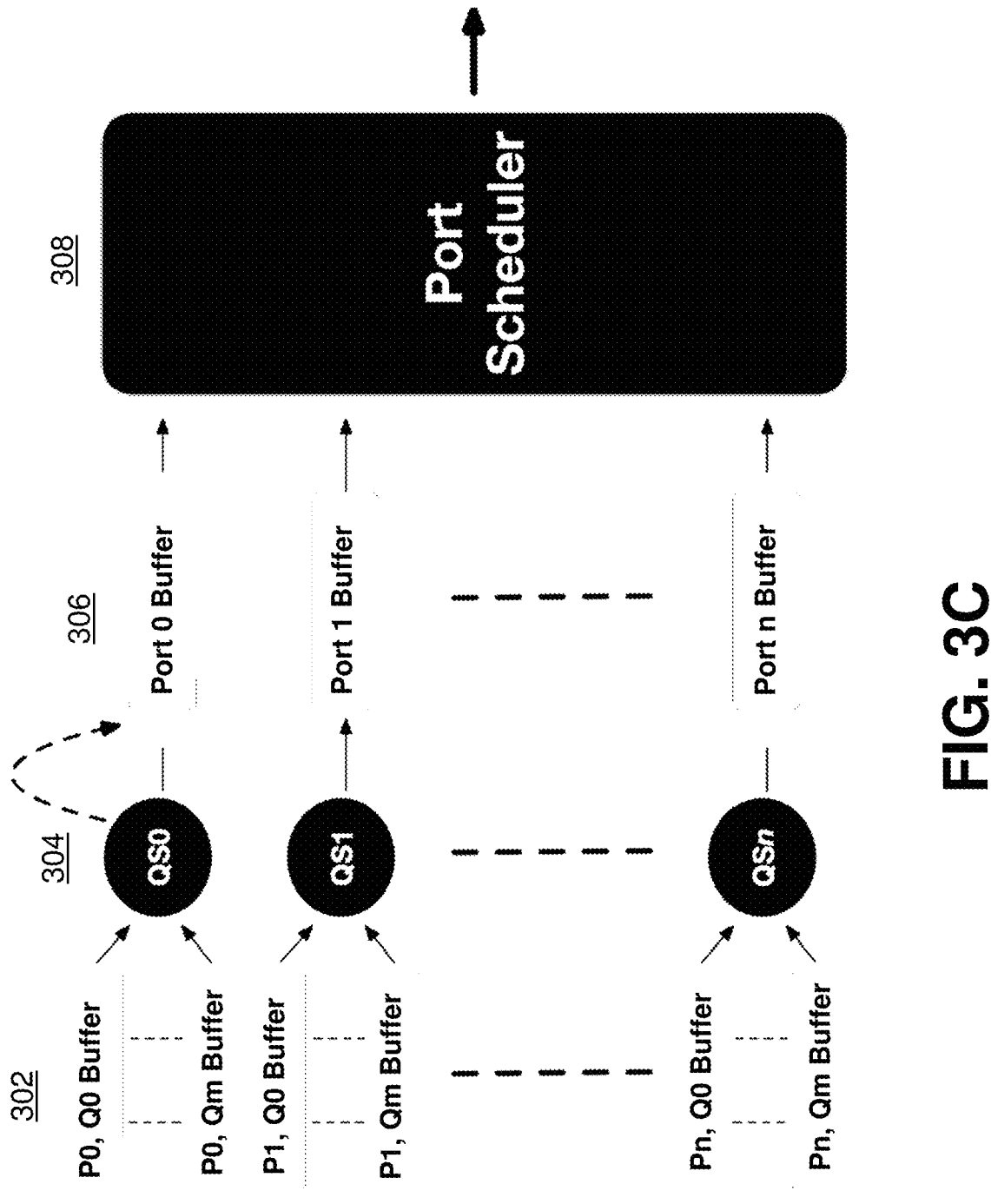
FIG. 3C and FIG. 3D illustrate example operations of queue and port schedulers.
Figure 3D:
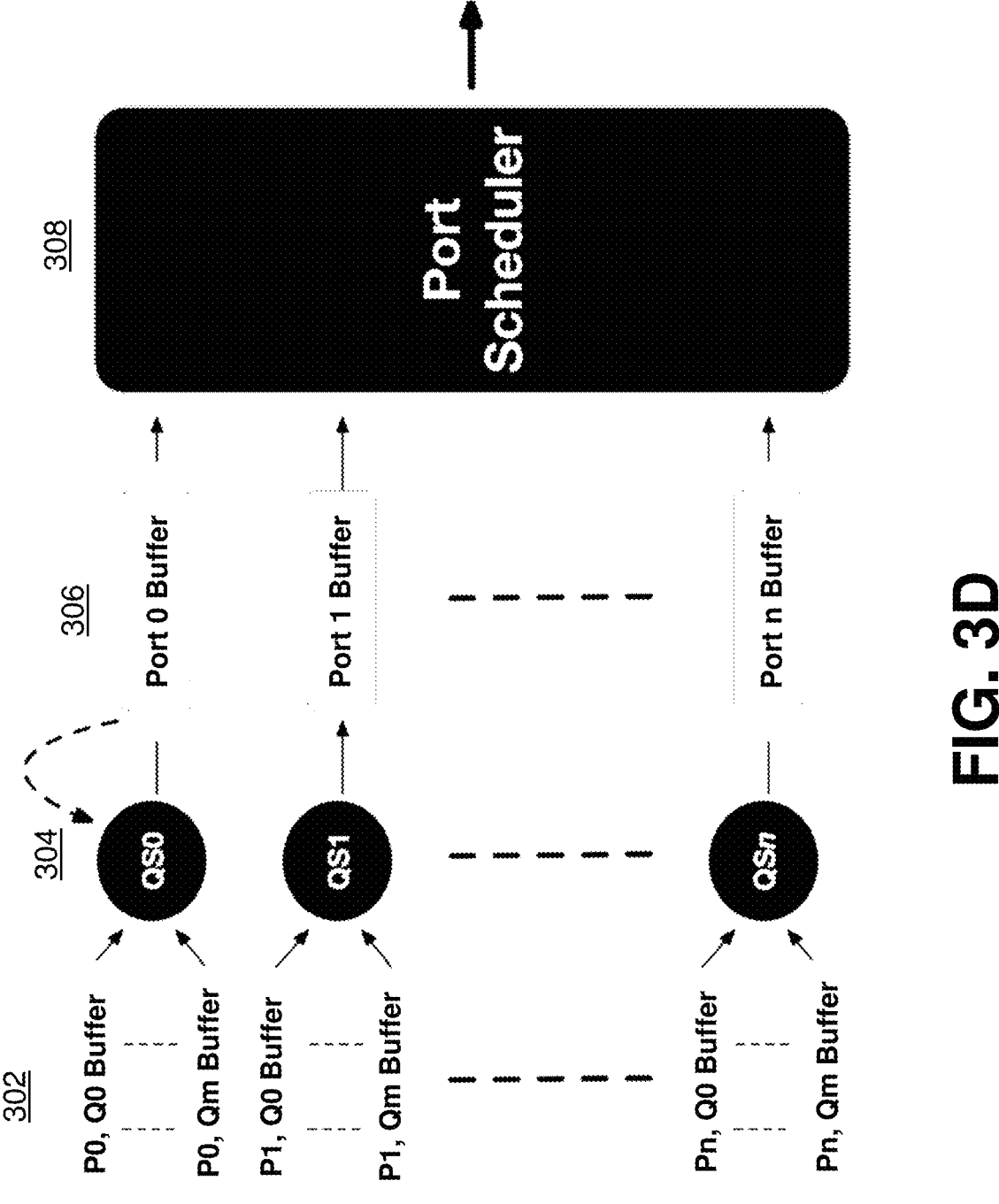

FIG. 3C and FIG. 3D illustrate example operations of queue and port schedulers in connection with port selection buffers.

As shown in FIG. 3C, the plurality of queuing schedulers 304 ("QS0" through "QSn") may fetch or dequeue selections (or picks) of packets or cells/transfers thereof from the plurality of queues of the port by way of fetching or dequeuing selections (or picks) of queue selection buffer entries corresponding to the packets or the cells/transfers thereof the plurality of groups of queue selection buffers 302 ("P0, Q0 Buffer," . . . "P0, Qm Buffer," "P1, Q0 Buffer," . . . "P1, Qm Buffer," . . . "Pn, Q0 Buffer," . . . "Pn, Qm Buffer"). Each selection from a queue—in the selections (or picks) from the plurality of groups of queues—results in the selection or pick in the queue being dequeued and/or pushed into a corresponding port selection buffer. The port selection buffer may contain up to N selections or port selection buffer entries for the port as made by queue scheduler in the group of queue selection buffers for the same port.

As shown in FIG. 3D, a queue scheduler for the port may make selections until the port selection buffer becomes full—for example, all N port selection buffer entries have been used for N sets of packet data for N packets. Back pressure may be asserted on—or flow control operations may be performed with—the queue scheduler to pause or delay making and pushing additional sets of packet data corresponding to additional selections of queue selection buffers from the group of queue selection buffers into the port selection buffer.

The port scheduler 308 and the queue scheduler can perform their respective scheduling (selections and queuing operations) independently. The port scheduler 308 can (e.g., concurrently, etc.) perform scheduling operations on the port to which the queue scheduler corresponds as well as on other (e.g., only, etc.) eligible ports with non-empty port selection buffers and/or with non-empty queues.

In some operational scenarios, the port and queue schedulers as described herein may be implemented or configured to perform multi-packet scheduling operations.

In a first example, a buffer entry at queue selection or port selection level may contain multiple packets per buffer entry. Additionally, optionally or alternatively, the total number of packets per (port or queue) selection buffer entry may vary, or may be a function of, sizes of packets. The multi-packet scheduling operations can be used to enable or support scheduling operations to dequeue multiple packets per CPU or clock cycle for relatively high throughput.

In a second example, each of some or all of the queue and port schedulers can be implemented or configured to select multiple (queue or port) selection buffer entries per scheduling event or per CPU or clock cycle. For instance, the port scheduler may be implemented or configured to select up to M packets from M different queues or M different queue selection buffer entries (in the queue selection buffers associated with the port) in a single CPU or clocks cycle.

Multiple packets represented in a single buffer entry or multiple buffer entries of a queue or port selection buffer may be selected or dequeued from the queue or port selection buffer in single CPU or clock cycle based at least in part on priority indications of the packets, sequence indications or indexes/numbers of the packets, and so on.

3.8. Port Bundle Scheduling

Figure 4:
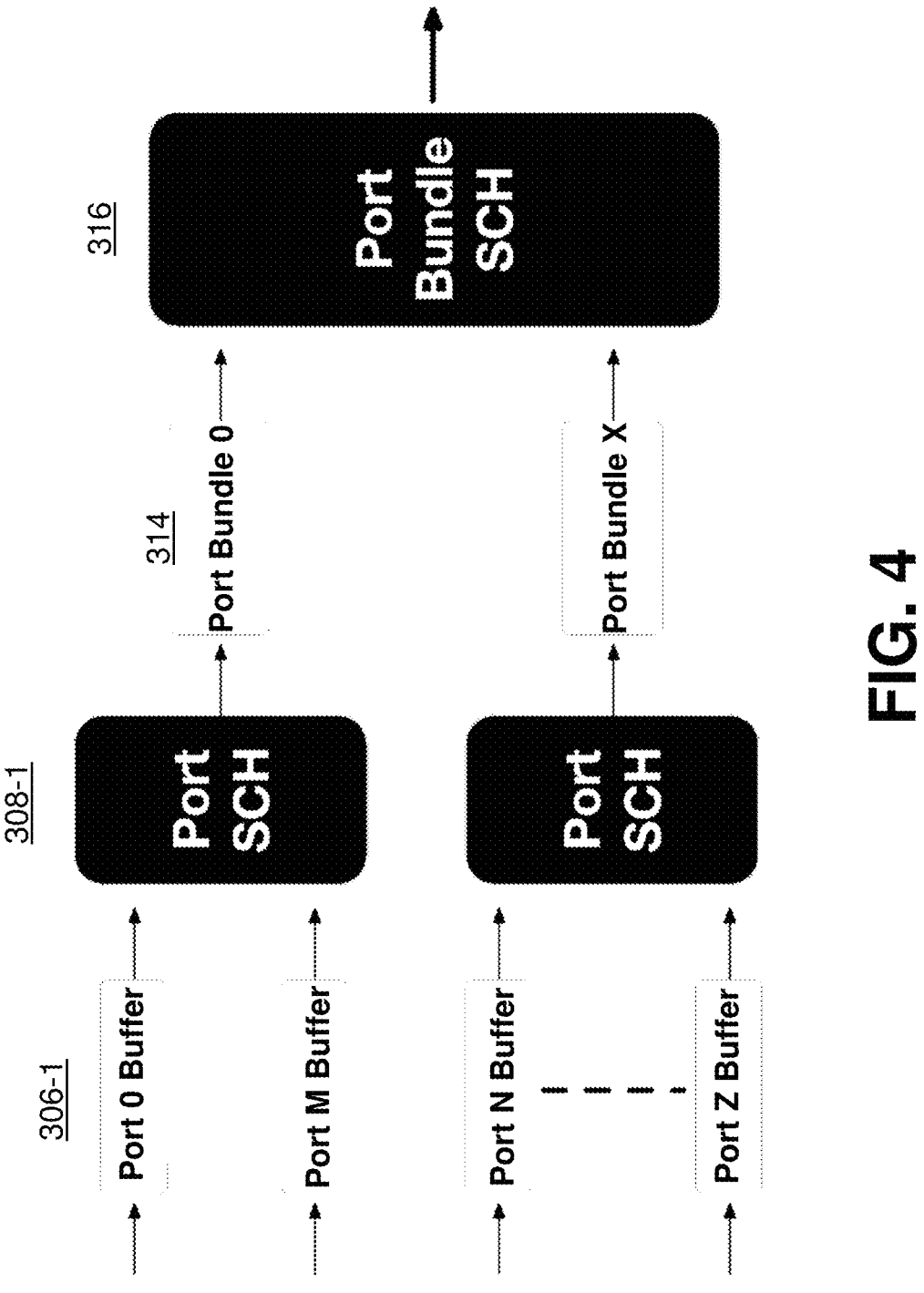
FIG. 4 illustrates example port bundle scheduling operations.

In some operational scenarios, to support relatively high speed scheduling operations, the multi-stage scheduler as described herein may be implemented or configured to support port bundle scheduling operations. As illustrated in FIG. 4, the plurality of port selection buffers 306 for the plurality of ports in the network node/switch may be (e.g., mutual-exclusively, etc.) partitioned into a plurality of different port selection buffer bundles 306-1 corresponding to a plurality of different port bundles 314 (e.g., mutual-exclusively, etc.) partitioned from the plurality of ports. Each port selection buffer bundle in the plurality of different port selection buffer bundles 306-1 may include one or more port selection buffers for one or more ports constituting a respective port bundle in the plurality of different port bundles 314. For example, the network node/switch may have 128 ports, which may be separated or partitioned into two port bundles of 64 ports each.

A plurality of port schedulers 308-1 may be implemented or configured to concurrently and/or independently perform packet-level or cell-level scheduling operations for transmission or transfer operations through ports in the plurality of different port bundles 314. More specifically, each port scheduler in the plurality of port schedulers 308-1 may be implemented or configured to perform packet-level or cell-level scheduling operations for transmission or transfer operations through ports in a respective port bundle in the plurality of different port bundles 314, concurrently and/or independently with scheduling operations performed by any other port scheduler(s) in the plurality of port schedulers 308-1.

The plurality of different port schedulers 308-1 can be implemented or configured to make or push respective selections or picks from the plurality of different port selection buffer bundles (e.g., "Port 0 Buffer" through "Port M Buffer," . . . "Port N Buffer" through "Port Z Buffer," etc.) into a plurality of port bundle selection buffers (e.g., for "Port Bundle 0" through "Port Bundle X", etc.). More specifically, each port scheduler in the plurality of different port schedulers can be implemented or configured to make or push selections or picks from a respective port selection buffer bundle (e.g., "Port 0 Buffer" through "Port M Buffer," etc.) in the plurality of different port selection buffer bundles into a respective port bundle selection buffer (e.g., "Port Bundle 0." etc.) in the plurality of port bundle selection buffers. A port bundle selection buffer as described herein may contain buffer entries each of which may have a similar data structure to a port selection buffer entry in a port selection buffer.

Techniques as described herein, including but not limited to port bundling scheduling techniques, may be used to perform scheduling operations for transmitting or transferring packets at a relatively high bandwidth or transmission/transfer rate. Timing risks including but not limited to starvation may be prevented or significantly reduced under these techniques.

As queues can be activated or scheduled with minimized delays by way of using port and queue selection buffers to prepare packets for transmission or transfer, relatively low latency in queuing, buffering, scheduling, transmitting and/or transferring can be achieved.

Additionally, optionally or alternatively, these techniques including but not limited to port bundle scheduling 316 (or a corresponding port bundle scheduler) can scale to relatively high individual and/or overall throughputs or port rates for ports of a network node/switch. Timing loops of port and queue schedulers in various system configurations of a multi-stage scheduler as described herein can be separate or independent. Each of some or all port and queue schedulers in the multi-stage scheduler can support multiple dequeues per clock cycle, operate at relatively high frequencies, and/or efficiently work with relatively high port densities (e.g., using port bundle scheduling 316, etc.).

4.0. Example Embodiments

Figure 5:
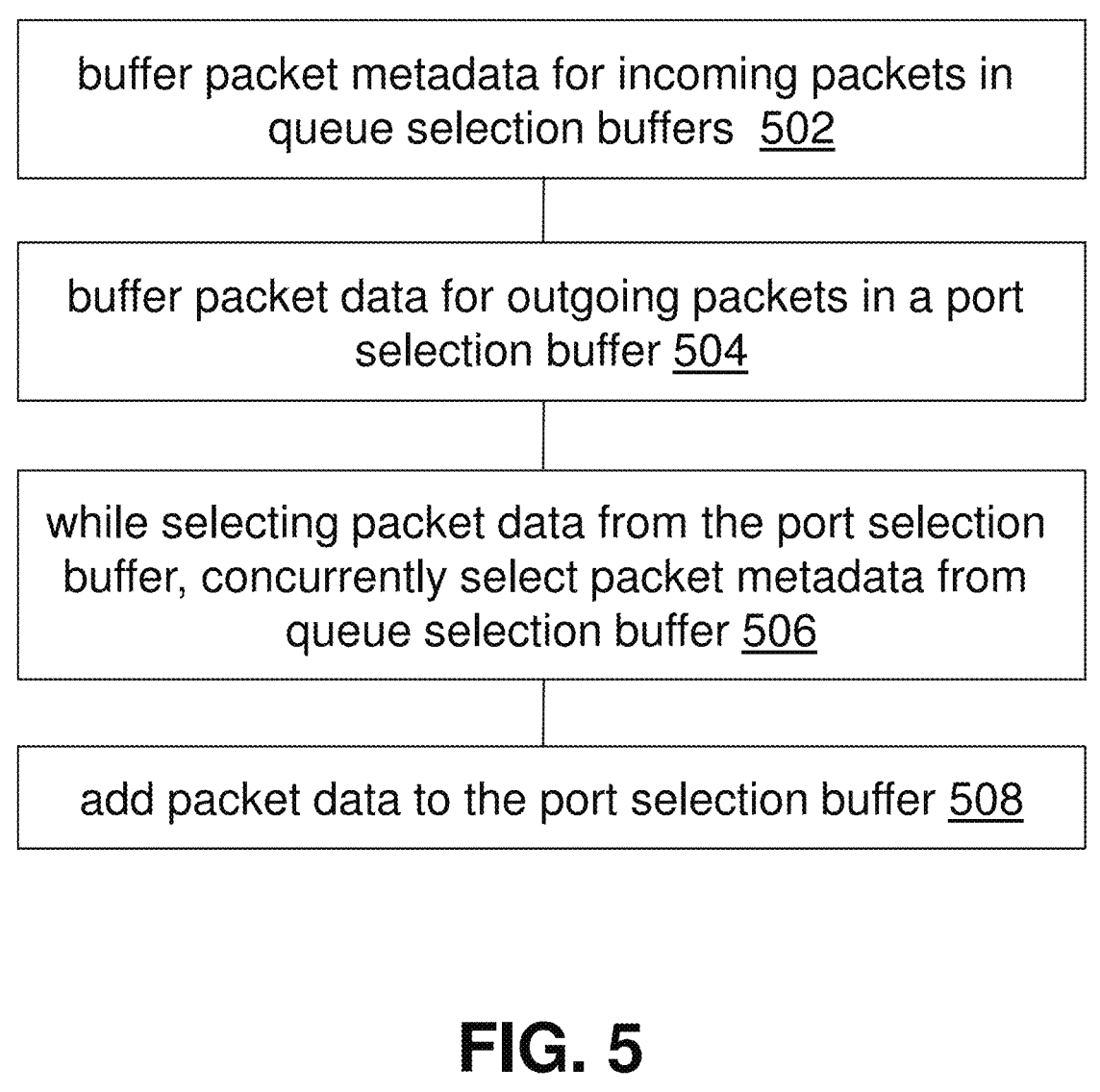

FIG. 5 illustrates an example process flow, according to an embodiment. The various elements of the flow described below may be performed by one or more network devices implemented with one or more computing devices. In block 502, a queue scheduler of a multi-stage scheduler buffers a plurality of sets of packet metadata for a plurality of incoming packets in a plurality of queue selection buffers associated with a port of a network node.

In block 504, a port scheduler of the multi-stage scheduler buffers one or more sets of packet metadata for one or more outgoing packets in a port selection buffer associated with the port.

In block 506, at a selection clock cycle, while the port scheduler of the multi-stage scheduler of the network node selects a subset of the one or more sets of packet metadata for a subset of the one or more outgoing packets from the port selection buffer, the queue scheduler of the port for a plurality of packet queues set up for the port concurrently selects one or more second sets of packet metadata for one or more incoming packets in the plurality of incoming packets from among the plurality of sets of packet metadata stored in the plurality of queue selection buffers.

In block 508, the queue scheduler adds the one or more second sets of packet metadata for one or more second outgoing packets to the port selection buffer of the port.

In an embodiment, each queue selection buffer in the plurality of queue selection buffers is associated with a respective packet queue in the plurality of packet queues set up for the port.

In an embodiment, each set of packet metadata in the one or more sets of packet metadata is for a respective outgoing packet in the one or more outgoing packets.

In an embodiment, each queue selection buffer in the plurality of queue selection buffers includes a respective set of per-queue indicators. The respective set of per-queue indicators includes one or more of: a queue-empty-state indicator, a queue-empty-on-pick indicator, an end-of-packet-on-pick indicator, etc.

In an embodiment, each set of packet metadata in the plurality of sets of packet metadata is for a respective incoming packet in the plurality of incoming packets; the set of packet metadata for the respective incoming packet includes one or more of: a packet copy count, a packet transfer count, etc.

In an embodiment, the port belongs to a plurality of ports of the network node; the multi-stage scheduler further performs: buffering a second plurality of sets of packet metadata for a second plurality of incoming packets in a second plurality of queue selection buffers associated with a second port in the plurality of the ports of the network node; buffering one or more third sets of packet metadata for one or third second outgoing packets in a second port selection buffer associated with the second port; at said selection clock cycle, while selecting, by the port scheduler of the network node, a second subset of the one or more third sets of packet metadata for a second subset of the one or more second outgoing packets from the second port selection buffer, concurrently performing by a second queue scheduler of the second port for a second plurality of packet queues: selecting one or more fourth sets of packet metadata for one or more second incoming packets in the second plurality of incoming packets from among the second plurality of sets of packet metadata stored in the second plurality of queue selection buffers; adding the one or more fourth sets of packet metadata for one or more fourth outgoing packets to the second port selection buffer of the second port.

In an embodiment, the port scheduler performs a work-conserving time-division-multiplexing selection method.

In an embodiment, the queue scheduler performs one of: a strict priority based selection method, a weighted dynamic round-robin selection method, a weighted round-robin selection method, a threshold-based selection method, a combination of two or more different selection methods, etc.

In an embodiment, a computing device such as a switch, a router, a line card in a chassis, a network device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 6:
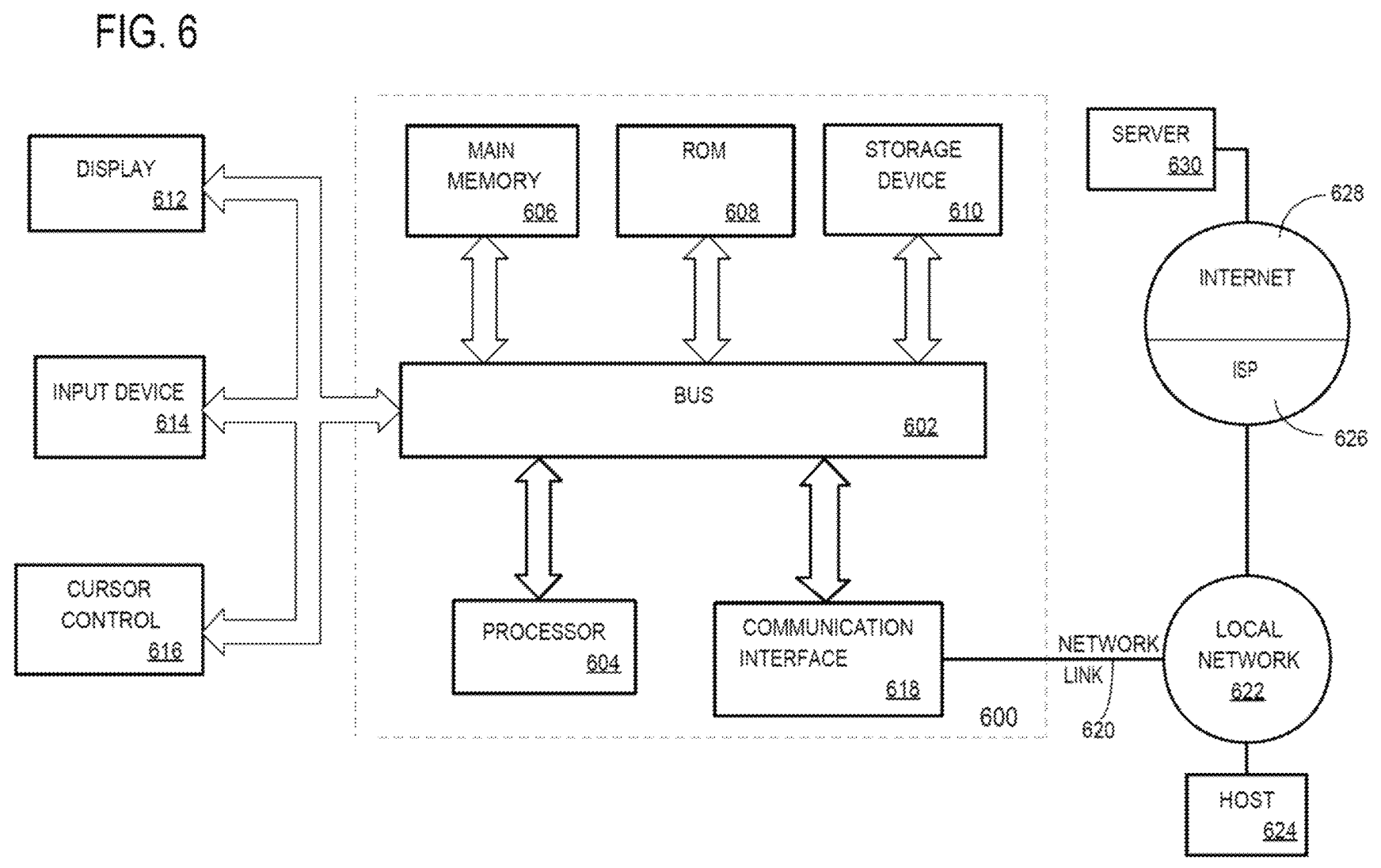

FIG. 6 is a block diagram that illustrates an example computer system 600 that may be utilized in implementing the above-described techniques, according to an embodiment. Computer system 600 may be, for example, a desktop computing device, laptop computing device, tablet, smartphone, server appliance, computing mainframe, multimedia device, handheld device, networking apparatus, or any other suitable device. In an embodiment, FIG. 6 constitutes a different view of the devices and systems described in previous sections.

Computer system 600 may include one or more ASICs, FPGAs, or other specialized circuitry 603 for implementing program logic as described herein. For example, circuitry 603 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 600 may include one or more hardware processors 604 configured to execute software-based instructions. Computer system 600 may also include one or more busses 602 or other communication mechanism for communicating information. Busses 602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 600 also includes one or more memories 606, such as a RAM, hardware registers, or other dynamic or volatile storage device for storing data units to be processed by the one or more ASICs, FPGAs, or other specialized circuitry 603. Memory 606 may also or instead be used for storing information and instructions to be executed by processor 604. Memory 606 may be directly connected or embedded within circuitry 603 or a processor 604. Or, memory 606 may be coupled to and accessed via bus 602. Memory 606 also may be used for storing temporary variables, data units describing rules or policies, or other intermediate information during execution of program logic or instructions.

Computer system 600 further includes one or more read only memories (ROM) 608 or other static storage devices coupled to bus 602 for storing static information and instructions for processor 604. One or more storage devices 610, such as a solid-state drive (SSD), magnetic disk, optical disk, or other suitable non-volatile storage device, may optionally be provided and coupled to bus 602 for storing information and instructions.

A computer system 600 may also include, in an embodiment, one or more communication interfaces 618 coupled to bus 602. A communication interface 618 provides a data communication coupling, typically two-way, to a network link 620 that is connected to a local network 622. For example, a communication interface 618 may be an integrated services digital network (ISDN) card, cable modem, satellite modem, or a modem to provide a data communication connection to a corresponding type of telephone line. As another example, the one or more communication interfaces 618 may include a local area network (LAN) card to provide a data communication connection to a compatible LAN. As yet another example, the one or more communication interfaces 618 may include a wireless network interface controller, such as an 602.11-based controller, Bluetooth controller, Long Term Evolution (LTE) modem, and/or other types of wireless interfaces. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by a Service Provider 626. Service Provider 626, which may for example be an Internet Service Provider (ISP), in turn provides data communication services through a wide area network, such as the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

In an embodiment, computer system 600 can send and receive data units through the network(s), network link 620, and communication interface 618. In some embodiments, this data may be data units that the computer system 600 has been asked to process and, if necessary, redirect to other computer systems via a suitable network link 620. In other embodiments, this data may be instructions for implementing various processes related to the described techniques. For instance, in the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. As another example, information received via a network link 620 may be interpreted and/or processed by a software component of the computer system 600, such as a web browser, application, or server, which in turn issues instructions based thereon to a processor 604, possibly via an operating system and/or other intermediate layers of software components.

Computer system 600 may optionally be coupled via bus 602 to one or more displays 612 for presenting information to a computer user. For instance, computer system 600 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 612.

One or more input devices 614 are optionally coupled to bus 602 for communicating information and command selections to processor 604. One example of an input device 614 is a keyboard, including alphanumeric and other keys. Another type of user input device 614 is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet other examples of suitable input devices 614 include a touch-screen panel affixed to a display 612, cameras, microphones, accelerometers, motion detectors, and/or other sensors. In an embodiment, a network-based input device 614 may be utilized. In such an embodiment, user input and/or other information or commands may be relayed via routers and/or switches on a Local Area Network (LAN) or other suitable shared network, or via a peer-to-peer network, from the input device 614 to a network link 620 on the computer system 600.

As discussed, computer system 600 may implement techniques described herein using customized hard-wired logic, one or more ASICs or FPGAs 603, firmware and/or program logic, which in combination with the computer system causes or programs computer system 600 to be a special-purpose machine. According to one embodiment, however, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 600 can receive the data on the network and demodulate the signal to decode the transmitted instructions. Appropriate circuitry can then place the data on bus 602. Bus 602 carries the data to main memory 606, from which processor 604 retrieves and executes the instructions. The instructions received by main memory 606 may optionally be stored on storage device 610 either before or after execution by processor 604.

6.0. Extensions and Alternatives

As used herein, the terms "first," "second." "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   buffering a plurality of sets of packet metadata for a plurality of incoming packets in a plurality of queue selection buffers associated with a port of a network node;
   buffering one or more sets of packet metadata for one or more outgoing packets in a port selection buffer associated with the port;
   wherein the port belongs to a plurality of ports of the network node;
   buffering one or more additional sets of packet metadata for outgoing packets in a second port selection buffer associated with a second port in the plurality of the ports of network node;
   at a selection clock cycle, while selecting, by a port scheduler of the network node, a subset of the one or more sets of packet metadata for a subset of the one or more outgoing packets from the port selection buffer and a second subset of the one or more additional sets of packet metadata for a second subset of the outgoing packets from the second port selection buffer, concurrently performing by a queue scheduler of the port for a plurality of packet queues set up for the port:
      selecting one or more second sets of packet metadata for one or more incoming packets in the plurality of incoming packets from among the plurality of sets of packet metadata stored in the plurality of queue selection buffers;
      adding the one or more second sets of packet metadata for one or more second outgoing packets to the port selection buffer of the port.

2. The method of claim 1, wherein each queue selection buffer in the plurality of queue selection buffers is associated with a respective packet queue in the plurality of packet queues set up for the port.

3. The method of claim 1, wherein each set of packet metadata in the one or more sets of packet metadata is for a respective outgoing packet in the one or more outgoing packets.

4. The method of claim 1, wherein each queue selection buffer in the plurality of queue selection buffers includes a respective set of per-queue indicators; wherein the respective set of per-queue indicators includes one or more of: a queue-empty-state indicator, a queue-empty-on-pick indicator, or an end-of-packet-on-pick indicator.

5. The method of claim 1, wherein each set of packet metadata in the plurality of sets of packet metadata is for a respective incoming packet in the plurality of incoming packets; wherein the set of packet metadata for the respective incoming packet includes one or more of: a packet copy count, or a packet transfer count.

6. The method of claim 1, further comprising:

buffering a second plurality of sets of packet metadata for a second plurality of incoming packets in a second plurality of queue selection buffers associated with a second port in the plurality of the ports of the network node;

at said selection clock cycle, concurrently performing by a second queue scheduler of the second port for a second plurality of packet queues:

selecting one or more third sets of packet metadata for one or more second incoming packets in the second plurality of incoming packets from among the second plurality of sets of packet metadata stored in the second plurality of queue selection buffers;

adding the one or more third sets of packet metadata for one or more third outgoing packets to the second port selection buffer of the second port.

7. The method of claim 1, wherein the port scheduler performs a work-conserving time-division-multiplexing selection method.

8. The method of claim 1, wherein the queue scheduler performs one of: a strict priority based selection method, a weighted dynamic round-robin selection method, a weighted round-robin selection method, a threshold-based selection method, or a combination of two or more different selection methods.

9. A system comprising:

one or more computing devices;

one or more non-transitory computer readable media storing instructions that, when executed by the one or more computing devices, cause performance of:

buffering a plurality of sets of packet metadata for a plurality of incoming packets in a plurality of queue selection buffers associated with a port of a network node;

buffering one or more sets of packet metadata for one or more outgoing packets in a port selection buffer associated with the port;

wherein the port belongs to a plurality of ports of the network node;

buffering one or more additional sets of packet metadata for outgoing packets in a second port selection buffer associated with a second port in the plurality of the ports of network node;

at a selection clock cycle, while selecting, by a port scheduler of the network node, a subset of the one or more sets of packet metadata for a subset of the one or more outgoing packets from the port selection buffer and a second subset of the one or more additional sets of packet metadata for a second subset of the outgoing packets from the second port selection buffer, concurrently performing by a queue scheduler of the port for a plurality of packet queues set up for the port:

selecting one or more second sets of packet metadata for one or more incoming packets in the plurality of incoming packets from among the plurality of sets of packet metadata stored in the plurality of queue selection buffers;

adding the one or more second sets of packet metadata for one or more second outgoing packets to the port selection buffer of the port.

10. The system of claim 9, wherein each queue selection buffer in the plurality of queue selection buffers is associated with a respective packet queue in the plurality of packet queues set up for the port.

11. The system of claim 9, wherein each set of packet metadata in the one or more sets of packet metadata is for a respective outgoing packet in the one or more outgoing packets.

12. The system of claim 9, wherein each queue selection buffer in the plurality of queue selection buffers includes a respective set of per-queue indicators; wherein the respective set of per-queue indicators one or more of: a queue-empty-state indicator, a queue-empty-on-pick indicator, or an end-of-packet-on-pick indicator.

13. The system of claim 9, wherein each set of packet metadata in the plurality of sets of packet metadata is for a respective incoming packet in the plurality of incoming packets; wherein the set of packet metadata for the respective incoming packet includes one or more of: a packet copy count, or a packet transfer count.

14. The system of claim 9, wherein the instructions, when executed by the one or more computing devices, cause further performance of:

buffering a second plurality of sets of packet metadata for a second plurality of incoming packets in a second plurality of queue selection buffers associated with a second port in the plurality of the ports of the network node;

at said selection clock cycle, concurrently performing by a second queue scheduler of the second port for a second plurality of packet queues:

selecting one or more third sets of packet metadata for one or more second incoming packets in the second plurality of incoming packets from among the second plurality of sets of packet metadata stored in the second plurality of queue selection buffers;

adding the one or more third sets of packet metadata for one or more third outgoing packets to the second port selection buffer of the second port.

15. The system of claim 9, wherein the port scheduler performs a work-conserving time-division-multiplexing selection method.

16. The system of claim 9, wherein the queue scheduler performs one of: a strict priority based selection method, a weighted dynamic round-robin selection method, a weighted round-robin selection method, a threshold-based selection method, or a combination of two or more different selection methods.

17. One or more non-transitory computer readable media storing instructions that, when executed by one or more computing devices, cause performance of:

buffering a plurality of sets of packet metadata for a plurality of incoming packets in a plurality of queue selection buffers associated with a port of a network node;

buffering one or more sets of packet metadata for one or
more outgoing packets in a port selection buffer asso-
ciated with the port;

wherein the port belongs to a plurality of ports of the
network node;

buffering one or more additional sets of packet metadata
for outgoing packets in a second port selection buffer
associated with a second port in the plurality of the
ports of network node;

at a selection clock cycle, while selecting, by a port
scheduler of the network node, a subset of the one or
more sets of packet metadata for a subset of the one or
more outgoing packets from the port selection buffer
and a second subset of the one or more additional sets
of packet metadata for a second subset of the outgoing
packets from the second port selection buffer, concur-
rently performing by a queue scheduler of the port for
a plurality of packet queues set up for the port:

selecting one or more second sets of packet metadata
for one or more incoming packets in the plurality of
incoming packets from among the plurality of sets of
packet metadata stored in the plurality of queue
selection buffers;

adding the one or more second sets of packet metadata
for one or more second outgoing packets to the port
selection buffer of the port.

18. The one or more non-transitory computer readable
media of claim 17, wherein each queue selection buffer in
the plurality of queue selection buffers is associated with a
respective packet queue in the plurality of packet queues set
up for the port.

19. The one or more non-transitory computer readable
media of claim 17, wherein each set of packet metadata in
the one or more sets of packet metadata is for a respective
outgoing packet in the one or more outgoing packets.

20. The one or more non-transitory computer readable
media of claim 17, wherein each queue selection buffer in
the plurality of queue selection buffers includes a respective
set of per-queue indicators; wherein the respective set of
per-queue indicators includes one or more of: a queue-
empty-state indicator, a queue-empty-on-pick indicator, or
an end-of-packet-on-pick indicator.

21. The one or more non-transitory computer readable
media of claim 17, wherein each set of packet metadata in
the plurality of sets of packet metadata is for a respective
incoming packet in the plurality of incoming packets;
wherein the set of packet metadata for the respective incom-
ing packet includes one or more of: a packet copy count, or
a packet transfer count.

22. The one or more non-transitory computer readable
media of claim 17, wherein the instructions, when executed
by the one or more computing devices, cause further per-
formance of:

buffering a second plurality of sets of packet metadata for
a second plurality of incoming packets in a second
plurality of queue selection buffers associated with a
second port in the plurality of the ports of the network
node;

at said selection clock cycle, concurrently performing by
a second queue scheduler of the second port for a
second plurality of packet queues:

selecting one or more third sets of packet metadata for
one or more second incoming packets in the second
plurality of incoming packets from among the sec-
ond plurality of sets of packet metadata stored in the
second plurality of queue selection buffers;

adding the one or more third sets of packet metadata for
one or more third outgoing packets to the second port
selection buffer of the second port.

23. The one or more non-transitory computer readable
media of claim 17, wherein the port scheduler performs a
work-conserving time-division-multiplexing selection
method.

24. The one or more non-transitory computer readable
media of claim 17 wherein the queue scheduler performs
one of: a strict priority based selection method, a weighted
dynamic round-robin selection method, a weighted round-
robin selection method, a threshold-based selection method,
or a combination of two or more different selection methods.

25. A method comprising:

buffering a plurality of sets of packet metadata for a
plurality of incoming packets in a plurality of queue
selection buffers associated with a port of a network
node;

buffering one or more sets of packet metadata for one or
more outgoing packets in a port selection buffer asso-
ciated with the port;

at a selection clock cycle, while selecting, by a port
scheduler of the network node, a subset of the one or
more sets of packet metadata for a subset of the one or
more outgoing packets from the port selection buffer,
concurrently performing by a queue scheduler of the
port for a plurality of packet queues set up for the port:

selecting one or more second sets of packet metadata
for one or more incoming packets in the plurality of
incoming packets from among the plurality of sets of
packet metadata stored in the plurality of queue
selection buffers;

adding the one or more second sets of packet metadata
for one or more second outgoing packets to the port
selection buffer of the port;

wherein the port belongs to a plurality of ports of the
network node;

buffering a second plurality of sets of packet metadata for
a second plurality of incoming packets in a second
plurality of queue selection buffers associated with a
second port in the plurality of the ports of the network
node;

buffering one or more third sets of packet metadata for
one or third second outgoing packets in a second port
selection buffer associated with the second port;

at said selection clock cycle, while selecting, by the port
scheduler of the network node, a second subset of the
one or more third sets of packet metadata for a second
subset of the one or more second outgoing packets from
the second port selection buffer, concurrently perform-
ing by a second queue scheduler of the second port for
a second plurality of packet queues:

selecting one or more fourth sets of packet metadata for
one or more second incoming packets in the second
plurality of incoming packets from among the sec-
ond plurality of sets of packet metadata stored in the
second plurality of queue selection buffers;

adding the one or more fourth sets of packet metadata
for one or more fourth outgoing packets to the
second port selection buffer of the second port.

26. A system comprising:

one or more computing devices;

one or more non-transitory computer readable media
storing instructions that, when executed by the one or
more computing devices, cause performance of:

buffering a plurality of sets of packet metadata for a plurality of incoming packets in a plurality of queue selection buffers associated with a port of a network node;

buffering one or more sets of packet metadata for one or more outgoing packets in a port selection buffer associated with the port;

at a selection clock cycle, while selecting, by a port scheduler of the network node, a subset of the one or more sets of packet metadata for a subset of the one or more outgoing packets from the port selection buffer, concurrently performing by a queue scheduler of the port for a plurality of packet queues set up for the port:

selecting one or more second sets of packet metadata for one or more incoming packets in the plurality of incoming packets from among the plurality of sets of packet metadata stored in the plurality of queue selection buffers;

adding the one or more second sets of packet metadata for one or more second outgoing packets to the port selection buffer of the port;

wherein the port belongs to a plurality of ports of the network node;

buffering a second plurality of sets of packet metadata for a second plurality of incoming packets in a second plurality of queue selection buffers associated with a second port in the plurality of the ports of the network node;

buffering one or more third sets of packet metadata for one or third second outgoing packets in a second port selection buffer associated with the second port;

at said selection clock cycle, while selecting, by the port scheduler of the network node, a second subset of the one or more third sets of packet metadata for a second subset of the one or more second outgoing packets from the second port selection buffer, concurrently performing by a second queue scheduler of the second port for a second plurality of packet queues:

selecting one or more fourth sets of packet metadata for one or more second incoming packets in the second plurality of incoming packets from among the second plurality of sets of packet metadata stored in the second plurality of queue selection buffers;

adding the one or more fourth sets of packet metadata for one or more fourth outgoing packets to the second port selection buffer of the second port.

27. One or more non-transitory computer readable media storing instructions that, when executed by one or more computing devices, cause performance of:

buffering a plurality of sets of packet metadata for a plurality of incoming packets in a plurality of queue selection buffers associated with a port of a network node;

buffering one or more sets of packet metadata for one or more outgoing packets in a port selection buffer associated with the port;

at a selection clock cycle, while selecting, by a port scheduler of the network node, a subset of the one or more sets of packet metadata for a subset of the one or more outgoing packets from the port selection buffer, concurrently performing by a queue scheduler of the port for a plurality of packet queues set up for the port:

selecting one or more second sets of packet metadata for one or more incoming packets in the plurality of incoming packets from among the plurality of sets of packet metadata stored in the plurality of queue selection buffers;

adding the one or more second sets of packet metadata for one or more second outgoing packets to the port selection buffer of the port;

wherein the port belongs to a plurality of ports of the network node;

buffering a second plurality of sets of packet metadata for a second plurality of incoming packets in a second plurality of queue selection buffers associated with a second port in the plurality of the ports of the network node;

buffering one or more third sets of packet metadata for one or third second outgoing packets in a second port selection buffer associated with the second port;

at said selection clock cycle, while selecting, by the port scheduler of the network node, a second subset of the one or more third sets of packet metadata for a second subset of the one or more second outgoing packets from the second port selection buffer, concurrently performing by a second queue scheduler of the second port for a second plurality of packet queues:

selecting one or more fourth sets of packet metadata for one or more second incoming packets in the second plurality of incoming packets from among the second plurality of sets of packet metadata stored in the second plurality of queue selection buffers;

adding the one or more fourth sets of packet metadata for one or more fourth outgoing packets to the second port selection buffer of the second port.

* * * * *